Dec. 8, 1964    D. T. HANSON    3,160,147
ROTARY HEAT APPARATUS
Filed March 23, 1961    5 Sheets-Sheet 2

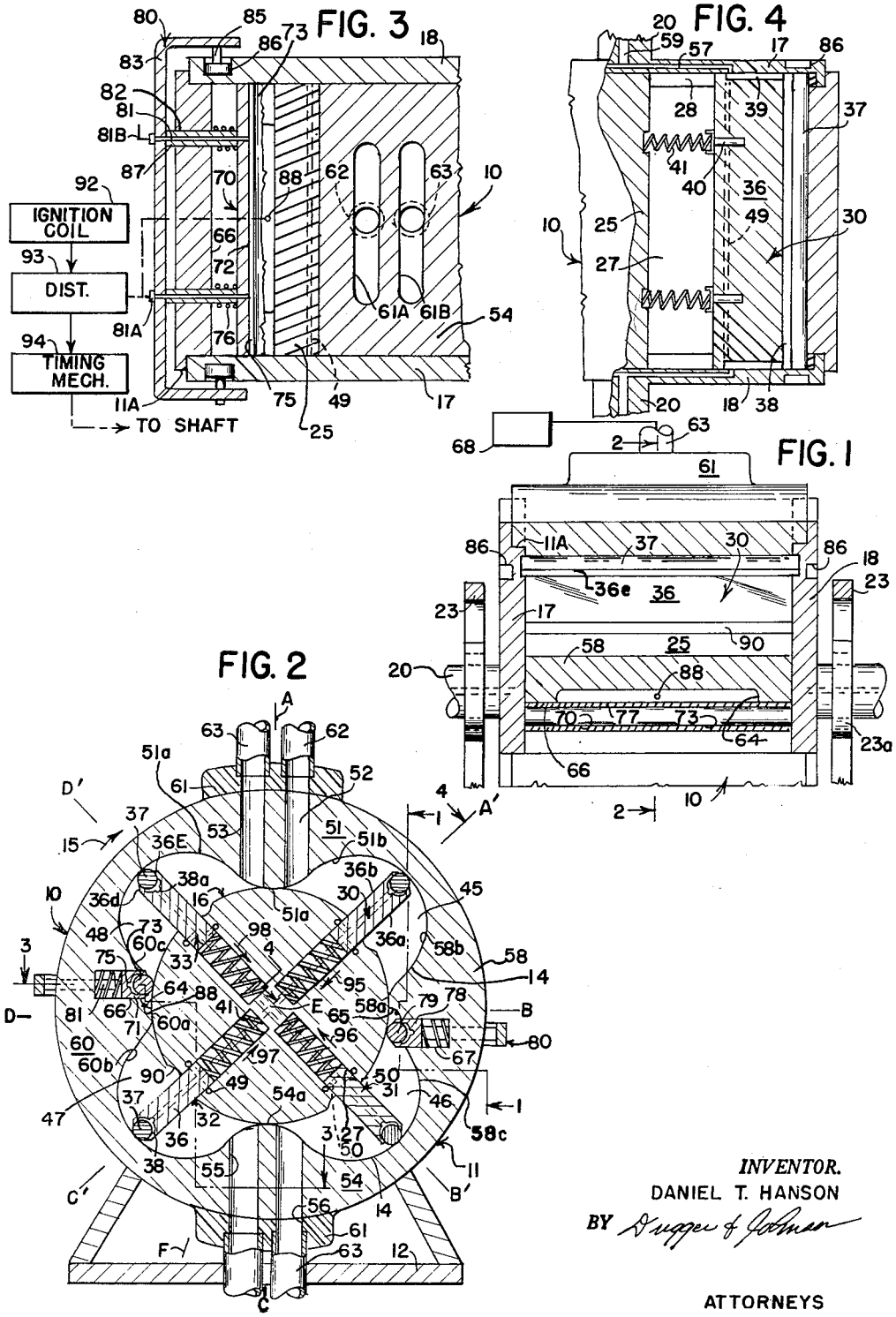

INVENTOR.
DANIEL T. HANSON
BY Dugger & Johnson
ATTORNEYS

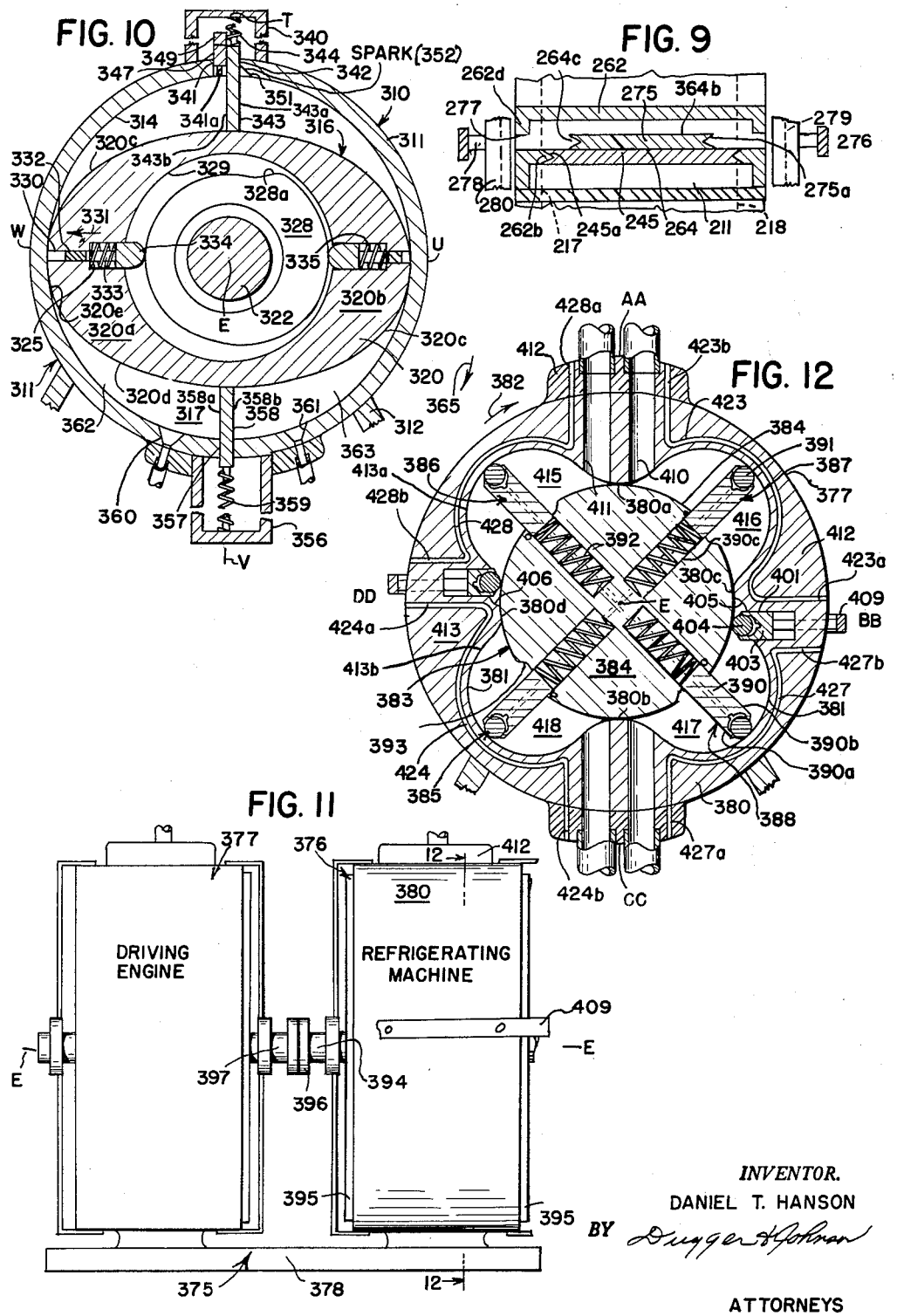

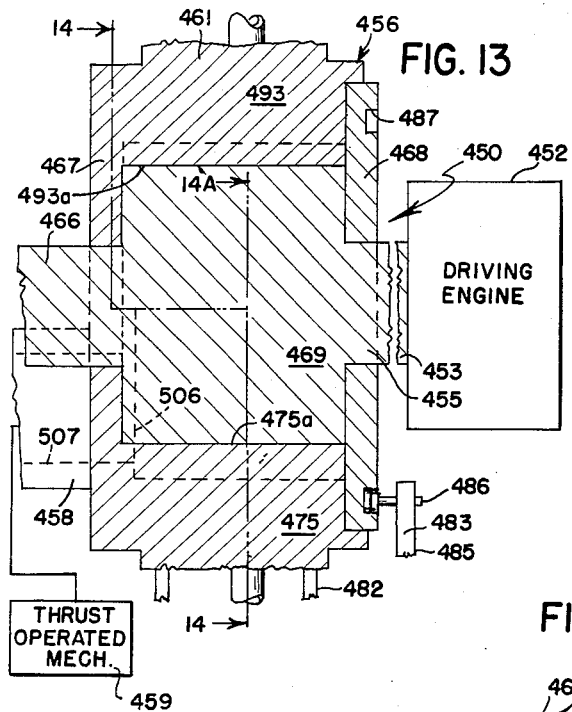
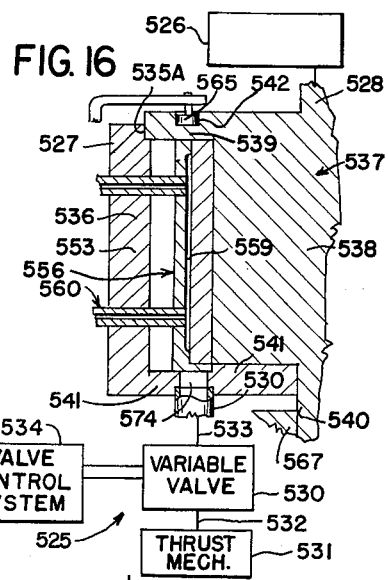
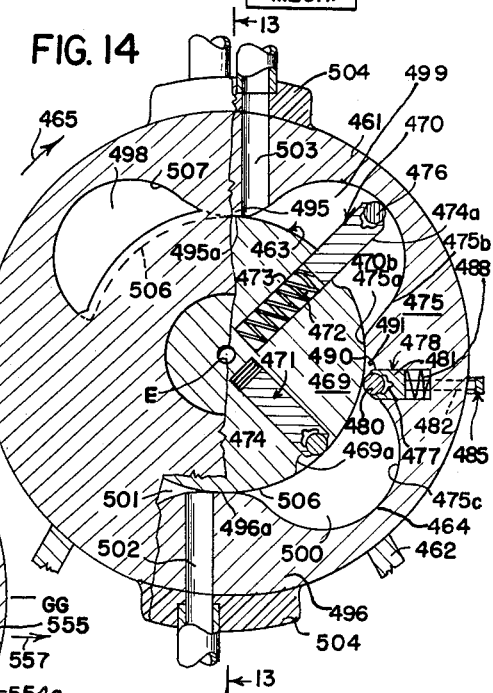
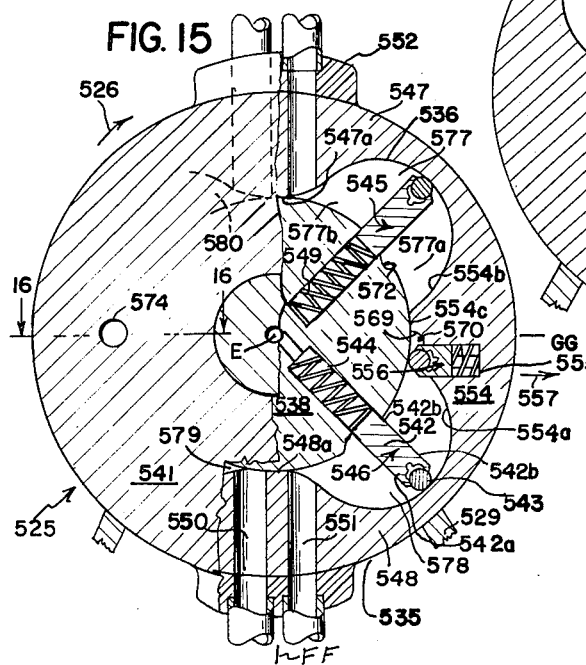

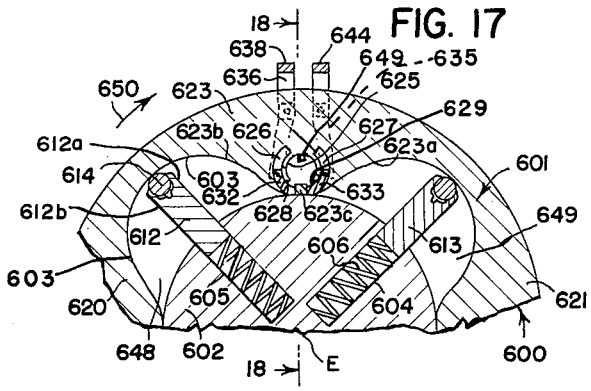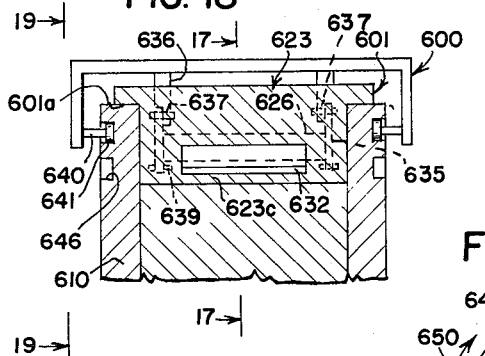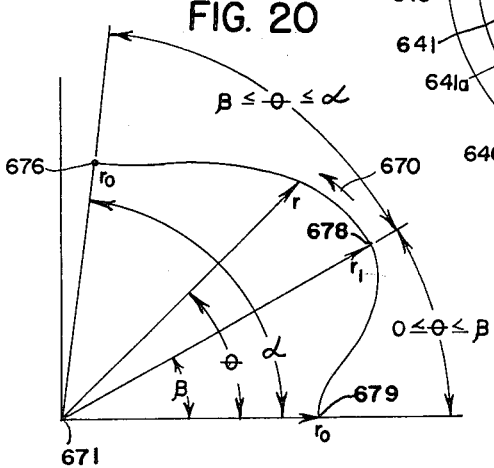

3,160,147
ROTARY HEAT APPARATUS
Daniel T. Hanson, St. Paul, Minn., assignor to
Clayton R. Johnson, Minneapolis, Minn.
Filed Mar. 23, 1961, Ser. No. 97,898
17 Claims. (Cl. 123—14)

This invention relates to new and novel rotary heat engines and to rotary refrigerating machines. More particularly, this invention relates to a new and novel heat engine of the type that the primary angular motion of a vane compresses a working substance of appropriate nature between the leading surface of the vane and the lagging surface of the abutment and in which as the vane proceeds past the abutment the working substance is transferred to exist in a region leading the surface of the abutment but lagging the surface of the vane and is allowed to expand in the region between the leading surface of the abutment and the lagging surface of the vane.

The heat engines of the prior art are limited to at least one of several physical means whereby useful work is derived from a given system. That is, the prior art heat engines require either, (1) that expansion work be done by a system upon some particular surface of the mechanism forming a heat engine and that the same surface has to serve to accomplish the preceding required compression on the system, or (2) that expansion work be done by a system upon some particular surface of material substance that exists in a distinctly separate region of space from the region occupied by other mechanism which has accomplished the preceding required compression process, or (3) some particular geometric arrangement of parts relative to each other and/or some particular auxiliary motion of some set of parts. As a result of the aforementioned limitations the operation of the prior art heat engines limits the generality (flexibility of construction) of these engines. The operating principles of the prior art heat engines are limiting in one or two general ways; namely (1) in any given finite interval of time the number of thermodynamic cycles that can be caused within a given region of space is limited by other than the physical size of parts for an engine of given over-all dimensions, or (2) heat transfers of working substance in a given region of space cannot be caused to approach continuity in time.

As will become apparent hereinafter, the heat engine of this invention is not limited by any of the aforementioned types of mechanisms deriving useful work even though either one of the first two types of mechanism may be used should one desire to do so. Likewise the operating principles of the heat engine of this invention do not restrict operation to either one of the last two mentioned limitations.

The heat engine of this invention may be readily used for static engines, marine engines (inboard and outboard), tractor power units and for aircraft units, or by providing cooling coils, as a refrigerating machine or by providing an outlet opening in the end wall of an expansion chamber as a direct thrust engine. The power to weight ratio is extremely high and thereby makes it readily adaptable for application in the above. In addition it is possible to use the same basic design for either spark ignition or diesel units.

An object of this invention is to provide a new and novel heat engine having a high power to weight ratio and of a design that may be readily used as general rotary heat engines for driving other units, or by the addition of cooling coils as a rotary refrigerating device. It is another object of this invention to provide a rotary heat engine having a general number of vanes wherein each of the vanes has an auxiliary motion independent of each of the other vanes and wherein each of the abutments of a general number of abutments has an auxiliary motion independent of the other abutments.

It is an additional object of this invention to provide a rotary heat engine having several vanes wherein each of the vanes acts to compress the working substance as a vane approaches a particular one of the abutments, and thereafter the working substance is caused to deliver expansion work to a surface of the last mentioned vane other than that which acts to compress the working substance as the vane moves away from the particular abutment.

It is still another object of this invention to provide a new and novel rotary heat engine having a general number of vanes that at least in part have auxiliary motion independent of each other and abutments movable independent of each other and that each of said parts has auxiliary motion dependent upon no more than a single abutment at any given instant.

It is still a further object of this invention to provide a new and novel heat engine of a nature that the leading and lagging surfaces of a vane each serve a different necessary function simultaneously. That is, it is an object of this invention to provide a rotary heat engine wherein each vane may be caused to act as two pistons with the leading surface of said vane functioning as the face of one piston while the lagging surface of said vane functions as the face of another piston and serves a different function than the first stated piston.

It is a further object of this invention to provide a new and novel heat engine that simultaneously fires in opposed chambers to minimize vibrations of the nature prevalent in prior art heat engines and, additionally, to achieve torque balance by using principles of the counter-rotation. It is a still further object of this invention to provide a new and novel heat engine of the type that has numerous uses wherein a wide range of torque output and horsepower are possible for adaptibility for use in light and heavy machinery and that a wide range of torque outputs are possible at fixed maximum horsepower and vice versa.

It is still another object of this invention to provide a new and novel heat engine that is of simplified construction and has a relatively high power to weight ratio. It is still a further object of this invention to provide a new and novel heat engine having a small number of moving parts and that gives a high value of mechanical efficiency, said heat engine eliminating the need for exhaust-intake valving, as well as crank shaft, and connecting rod since the power transmission is accomplished directly.

It is a further object of this invention to provide a rotary refrigerating machine that compresses a working substance between one surface of a vane and one surface of an abutment and that permits the expansion of said working substance to take place between an opposite surface of the same vane and a second separate and distinct surface of the same abutment. It is still another object of this invention to provide a heat engine that compresses a working substance between one surface of a vane, one surface of a rotor and one surface of an abutment in one chamber and expansion takes place in a second chamber to deliver useful work to thrust operated mechanism.

It is a further object of this invention to provide a new and novel rotary heat engine using an external source of heat for furnishing the necessary energy to a system to impart a driving force to the engine power member.

Other and further objects of this invention are those inherent in the invention herein illustrated, described and claimed, and will be apparent as the description proceeds.

To the accomplishment of the aforegoing and related ends, the invention then comprises the features hereinafter fully described and particularly pointed out in the claims, the description setting forth in detail certain illustrative embodiments of the invention, these being indicative, however, of but a few of the various ways in which the principles of the invention may be employed.

The invention is illustrated with reference to the drawings in which the corresponding numerals refer to the same parts and in which:

FIGURE 1 is a fragmentary side view of the first embodiment of the heat engine of this invention, said view for the most part being in section and taken along the line and in the direction of the arrows 1—1 of FIGURE 2;

FIGURE 2 is a cross sectional view of the first embodiment of the invention, said view being generally taken along the line and in the direction of the arrows 2—2 of FIGURE 1;

FIGURE 3 is a cross sectional view of the heat engine of FIGURE 2, said view being taken along the line and in the direction of the arrows 3—3 to illustrate the mounting of the transfer mechanism and to also show a portion of one of the manifolds. This view also diagrammatically illustrates the mechanism for producing a spark and the mechanism for controlling the timing of the ignition;

FIGURE 4 is a fragmentary view of the first embodiment of the heat engine, a portion of said view being generally taken along the line and in the direction of the arrows 4—4 of FIGURE 2 to illustrate the lubrication channels and the mounting of one of the vanes in rotor;

FIGURE 9 is a horizontal cross sectional view taken along the lines and in the direction of the arrows 9—9 of FIGURE 8 to more clearly illustrate the mounting of an abutment and the plunger bar for radial movement;

FIGURE 10 is a cross sectional view of the fourth embodiment of this invention taken along a plane perpendicular to the axis of rotation of the rotor member, said view corresponding to the view of the first embodiment illustrated in FIGURE 2;

FIGURE 11 is a side view of a fifth embodiment of this invention, said view illustrating a refrigerating machine and a driving engine for driving said refrigerating machine;

FIGURE 12 is a cross sectional view of the refrigerating machine of FIGURE 11 taken along the line and in the direction of the arrows 12—12 of FIGURE 11;

FIGURE 13 is a cross sectional view parallel to the axis of rotation of the rotor member of the sixth embodiment of this invention, there being diagrammatically illustrated a drive engine for driving the direct thrust engine of the sixth embodiment;

FIGURE 14 is a sectional view of the direct thrust engine illustrated in FIGURE 13, said view for the most part being taken along the line and in the direction of the arrows 14—14 and in part along the line and in the direction of the arrows 14—14A in order to illustrate both of the intake ports;

FIGURE 15 is a sectional view of the seventh embodiment of this invention that is for the most part taken along section lines of the structure of FIGURE 16 to provide a view that corresponds to FIGURE 14 of the sixth embodiment;

FIGURE 16 is a fragmentary cross sectional view of FIGURE 15 taken along the line and in the direction of the arrows 16—16 of FIGURE 15 to illustrate the transfer mechanism and the manner of delivering useful work to direct thrust mechanism, the direct thrust mechanism and valve controls being diagrammatically illustrated;

FIGURE 17 is a fragmentary cross sectional view of the eighth embodiment of the heat engine of this invention, said view being taken along a section plane perpendicular to the axis of rotation of the rotor member and in particular to the axis of rotation of the rotor member and in particular along the line and in the direction of the arrows 17—17 of FIGURE 18;

FIGURE 18 is a fragmentary cross sectional view taken along the line and in the direciton of the arrows 18—18 of FIGURE 17 to more clearly illustrate the mechanism for moving one of the arcuate bars to permit the flow of compressed gas into the cylindrical transfer chamber;

FIGURE 19 is an end view of the mechanism of FIGURE 18 taken along the line and in the direction of the arrows 19—19 of FIGURE 18 to illustrate the configuration of the cam tracks; and FIGURE 20 is a graphic representation of an equation for the camming surface of an inner peripheral wall of a housing for embodiments of the invention that utilize vanes such as shown in FIGURE 2.

Figure 5:
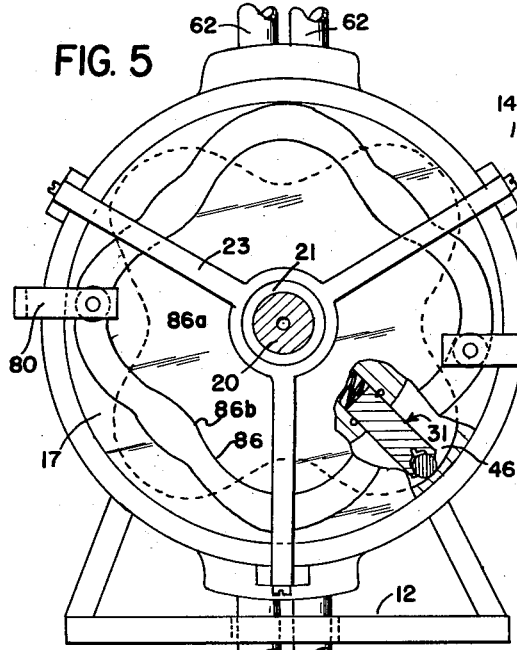
FIGURE 5 is an end view of the first embodiment to more clearly illustrate the cam track and cam follower mechanism, and the mounting of the shaft for rotation, part of the end plate being broken away to show the relative positions of a vane and the cam track.

In order to facilitate understanding of the invention the definition of some of the terminology used hereinafter is set forth as follows:

(1) A working substance is a set of one or more material substances of which set any arbitrary mass thereof may be caused to yield useful work (or refrigeration) by some general cyclic thermodynamic processing of said mass. The scope of the invention contemplates the use of working substances such as gasoline, diesel fuel, and solid fuels amongst others in combination with the necessary material to support combustion thereof.

(2) A system is some particular mass of a given working substance, which particular mass is undergoing some sequential change in thermo-dynamic state and which said sequential change of state describes the thermo dynamic cycle of said particular mass.

(3) A working substance path is a region of space over which one or several arbitrary masses of working substance shall be caused to move, which said region will have a finite area, which area shall be transverse relative to the direction of motion of each such mass, and of which area the perimeter thereof shall in some set of time intervals exist at a peripheral boundary of some of such masses.

(4) A vane is a set of one or more spatially continuous material substances in a solid state wherein the set may be caused to be moved with continuous angular displacement about some fixed axis to have a motion that will hereinafter be referred to as primary angular motion and said axis shall be termed primary axis of the vane and of which set part or all thereof may have rotational components of motion about some general axis or axes and/or translatory components of motion relative to the selected generalized set of coordinates, the last mentioned rotational and/or translation components of motion hereinafter collectively being termed auxiliary motion of the vane, wherein the set may be caused to provide at least part of the compressive work required for thermo dynamic processing of a given system and also may be caused to receive at least part of the expansion work delivered of or by a given system, which set may cause motion of working substance and may be caused to provide spatial separation of two or more regions of the working substance path, said spatial separation being provided by a spatial continuity of material substance between said set and other material substances of the surroundings.

(5) An abutment is a set of one or more spatially continuous solid material substances of which set all or part thereof may have translatory and/or angular components of motion, said translatory and/or angular components of motion hereinafter collectively being termed auxiliary motion of that abutment, that may provide forces resisting flow of the working substance such that said set may be caused to provide at least part of the necessary forces required for compression of a given system and/or such that a set may be caused to provide at least part of the necessary forces required to resistant expansion of a given system and which set may be caused to provide spatial separation of two or more regions of a working substance path, said spatial separation being provided by spatial continuity of material substances between said set and other material substances of the surroundings.

(6) The leading and the lagging surfaces of each vane are defined in terms of the primary angular motion of said vane and in the terms of a set of perimeters of said vane from which said set spatial continuity of material substance shall exist with solid material substances of the surroundings, the leading surface being that which exists in the direction of primary angular motion from said set of perimeters, wherein said surface does not include any perimeters of said set and the lagging surface existing in the direction opposite the direction of primary angular motion from said set of perimeters, wherein said lagging surface does not include any perimeter of said set.

(7) Abutment leading and lagging surfaces as defined in terms of primary angular motion of the vane that shall traverse said vane path and in terms of a set of perimeters of said abutment from which said set spatial continuity of material substance shall exist with solid material substance of the surroundings includes a leading surface that exists in the direction of primary angular motion from said set of perimeters and does not include any perimeters of said set and a lagging surface that exists in a direction opposite the direction of primary angular motion from said set of perimeters and does not include any perimeters of said set.

The first embodiment of the Rotary Heat Engine of this invention, generally designated 10, includes a housing 11 that has a hollow interior 14, the inner peripheral wall being configured to form a camming surface (see FIGURES 1-5). Rotatably mounted within the housing to be driven in the direction of the arrow 15 and rotate about an axis E is a power member, generally designated 16. End walls 17 and 18 are provided at opposite ends of the housing at either axial end of the power member and fixedly secured thereto by conventional means such as cap screws. An annular shoulder 11a is provided at each end of the housing to have the end walls retained in sealing engagement therewith. Extending axially outward from each end wall and secured thereto by conventional means (not shown) is a hollow shaft 20, each shaft being journalled for rotation in a bearing 21. A spider 23 is secured to the housing by conventional means (not shown) for mounting the bearing 21 in the bearing support portion 23a thereof. Appropriate power take-off mechanism (not shown) may be secured to either one or both of the shafts 20.

The power member 16 includes a rotor 25 that is generally of a radius so that the major portion of the outer circumferential surface thereof substantially forms a fluid seal with the inner peripheral wall portions of the housing that are of minimum spacing from the rotary axis E of the rotor. Four radial grooves 27 are formed in the rotor to extend the axial length thereof, said grooves being located at right angles to one another and of equal angular spacing. A groove 28 is provided in each end plate 17, 18 to be co-extensive with a groove 27. Located in the respective groove 27 to extend into abutting engagement with the walls of the end plates forming grooves 28 are the vanes, generally designated 30, 31, 32 and 33 respectively which form part of the power member.

Each vane has a leading surface 36a and a lagging surface 36b and includes a bar 36 slidably retained in the respective grooves 27, 28 and a roller bearing 37 rotatably retained in a recess 38 formed in the outer radial end of the bar 36. The recess 38 is shaped to prevent the roller bearing from moving in a radial direction outwardly therefrom while at the same time permitting the roller bearing to roll on the inner peripheral wall of the housing, the bars 36 having inwardly projecting portions 36d and 36e that form a close fit with the roller bearing outwardly from the center axis thereof, a recessed portion of the groove in cooperation with the roller bearing forms a lubricating channel 38a that extends the axial length of the vane and at either end opens into a radially extending channel 39 formed in each outer radial end portion of the respective vane.

The rotor is further recessed on either side of each of the vanes to form axial extending lubrication channel 49 that opens to the vane. The channels 49 are located to be close by the vanes as the vanes are moved between the two extreme radial positions. A bore 50 adjacent to each axial end of the rotor places the channel 49 in fluid communication with the respective groove 39. The grooves 39 open through the respective radial extending bores 57, the bores 57 at their inner ends opening into the axial extending aperture 59 formed in the respective shafts 20 that in turn open at the opposite ends to a source of lubricating material that causes the lubricating material to pass inwardly through one shaft and outwardly through the other.

The vanes are resiliently urged into abutting engagement with the housing by coil springs 41, each coil spring at one end being secured to the bottom wall of the groove 27 and at the other end secured to a pin 40 that is secured in the respective vane (see FIGURE 4). Although the vanes are resiliently urged into abutting engagement with the inner peripheral wall of the housing, it is to be noted that the grooves 27, 28 are of sufficient radial length whereby the outermost radial portion of the bearing 37 may be forced radially inwardly to a position that is the same distance from the rotary axis as that of the outer circumferential wall of the rotor.

The housing and rotor member cooperatively form four separate and distinct chambers, said chambers being designated 45, 46, 47 and 48 respectively. Chamber 45 is separated from chamber 48 by a separator 51 which is located between the radial line D'-E and A'-E. The separator 51 is curved so as to form a fluid seal with the rotor along an axially extending portion halfway between the aforementioned radial lines at 51a. An intake port 52 is formed in the housing to open into the chamber 45 at a position closely adjacent the portion 51a while an exhaust port 53 is formed in the housing to open into the chamber 48 on the opposite side of the portion 51a from the inlet port 52.

A manifold 61 is secured to the housing and has one portion thereof that forms an intake manifold that opens through the intake port of the housing and a second portion that forms an exhaust manifold that opens through the exhaust port of the housing. A line 63 connects the exhaust portion 61b of the manifold to appropriate exhaust apparatus (not shown) while the line 62 connects the intake portion 61a of the manifold to a carburetor 68 or an appropriate fuel injection system.

On the side of the rotor diametrically opposed from separator 51 and forming a portion of the housing is a separator 54. The separator 54 forms a fluid seal with the rotor along an axially directed line 54a to separate chamber 46 from chamber 47. An inlet port 55 formed in the housing places the chamber 47 in fluid communication with intake portion of a manifold 61 while an exhaust port 56 on the opposite side of 54a from the inlet port 55 places the chamber 46 in fluid communication with the exhaust portion of the same manifold, it being noted that separator 54 is located between the radial planes B'-E and C'-E. The last mentioned portions of the manifold may be connected to the previously mentioned fuel injection system and exhaust system respectively or to separate systems performing the respective functions.

Located between the separators 51 and 54 is an abutment 58. The abutment abuts against the rotor along an axially extending surface 58a to separate chamber 45 from the chamber 46. The surface of the abutment between the axially extending surface 58a and the radial plane A′–E constitutes the lagging surface 58b while the surface of the abutment between the axial line 58a and the radial plane B′–E constitutes the leading surface 58c. A second abutment 60 that is an integral portion of the housing diametrically across the rotor from the abutment 58 separates chamber 47 from chamber 48. The abutment 60 forms a fluid seal with the rotor along an axially extending surface 60a and has a lagging surface 60b and a leading surface 60c. As may be noted from observation of FIGURE 2, the surface 60b, 60c of abutment 60, the surface 58b, 58c of abutment 58 and the surfaces of the separators 51 and 54 are correspondingly shaped except for provision of the aforementioned ports 51, 53, 54, 55, the openings or ignition spaces 64 and 65, and the slots 66 and 67, and except as may be more fully described by mathematical expressions hereinafter presented. The purpose of providing the slots 66, 67 and the spaces 64, 65 will be described hereinafter.

As previously indicated the working substance is compressed between the leading surface of a vane and the lagging surface of a given abutment, but expansion takes place between the leading surface of the given abutment and the lagging surface of the vane. In order to permit the aforementioned operation each abutment and a portion of the rotor in conjunction with the vane and other mechanism described hereinafter cooperatively performs a transfer function. Each abutment has a transfer mechanism, generally designated 70, that includes a roller bearing holder 71 slidably mounted in a slot 66 formed in the abutment. The inner surface of the holder is provided with a recess 72 of a configuration similar to the recess 38, there being a roller bearing 73 rotatably retained in the recess 72. The roller bearing and the roller bearing holder cooperatively form a lubrication channel 75 that extends the axial length of the holder, said fluid channel at either end of the holder opening into a bore 81 formed in the lifter mechanism 80. The bores open through ports 81a that are connected through lines 81b to a suitable source of lubricating material.

The roller bearing holder through the lifter mechanism 80 retains the bearing 73 in fluid sealing engagement with the rotor during the time that the working substance is being compressed in, for example, chamber 47. However, subsequent to the working substance being ignited, the roller bearing is retracted by the lifter mechanism. The aforementioned lifter mechanism includes a pair of arms 87 that are extended through apertures 82 formed in the housing, one end of each arm being secured to the roller bearing holder 71 and the opposite end of each arm being secured to the web portion of the generally U-shaped bracket 83. In the outer end of each leg of the bracket 83 is mounted an axially extending cam follower 85 that includes a pair of rollers. The cam follower rollers on one of said legs rides in the cam track 86 formed in the end plate 18 (one roller of each pair riding off one of the oppositely faced surfaces of the cam track). The cam track is generally configured as shown in FIGURE 5, said cam track being somewhat more radially outwardly extending at 86a to lift the rollers out of sealing engagement at the appropriate portion of the cycle. The distance the cam tracks are curved outwardly with respect to the general radius of curvature of the rotor is sufficient to retract the innermost portion of the bearing to a position to be generally co-extensive with the extension of the surface 60c of the abutment or even further retracted. The track is curved inwardly at 86b so that the bearing 73 will be in fluid sealing engagement with the rotor at the appropriate time.

Intermediate the bearing 73 and the portion 60a of the abutment there is provided an ignition space 64 which as illustrated in FIGURE 1 does not extend the axial length of the housing. A spark plug 88 or other appropriate means for igniting the working substance is mounted in the housing to extend into the ignition space. The means 88, if it is for spark ignition type heat engine, is connected to a distributor 93 that is in turn connected to the ignition coil 92. The distributor system is timed to cause a spark to be produced at the desired point in the heat engine cycle by being connected through mechanism 94 that is synchronized to the rotation of the rotor.

In order to transfer the working substance into the ignition space, the rotor is formed with a recess 90 adjacent to the leading surface of each of the vanes. Each recess 90 in conjunction with the portion 36e of a vane is of a shape to have the bearing 73 roll into the recess to force substantially all the working substance out of said recess when the respective vane is in a fully retracted position. The recess 90 also is of sufficient depth so that in conjunction with space 64 and the vane in a retracted position, but with the roller bearing 37 in contact with the lagging surface 60b, the working substance will not be overly compressed. Further the recess 90 is shaped to permit transfer of the working substance into the space 64 as the leading surface of the vane approaches the axially extending surface 60a.

As the rotor is rotated the roller bearing 73 moves into the recess 90 whereupon the working substance is forced out of said recess into the ignition space 64. Since the ignition space does not extend the entire axial length of the abutment the roller bearing 73 is precluded from moving into said ignition space. At this point it is to be mentioned that the portion 58a (also 60a) is curved to form a close fit with the rotor through a circumferential distance that is at least one half of the circumferential thickness of a vane bar. This is done in order to maintain a seal between the ignition space and chamber 45.

As soon as the roller bearing 37 is moved to a radial position to have a diameter thereof form substantially a straight line continuation of a diameter line of the roller bearing 73, the lifter mechanism will initiate the retraction of the roller bearing 73 and its holder since the cam track is appropriately configured. At this time the working substance is between the lagging surface of the vane and the leading surface of the abutment. At substantially the same time or slightly before the initial retraction of the roller bearing 73 the ignition system provides a spark through the spark plug to ignite the combustible material of the working substance. This imparts energy to the working substance and thereupon expansion thereof takes place to exert a force against the lagging surface of the vane that had previously exerted a compressive force to cause the rotor member to continue to rotate and furnish a driving force at the power take-off (not shown). The aforementioned expansion continues to take place until the expanding system is able to move through the exhaust port. The expanded working substance is swept out of chamber through cooperative action of the rotor, the abutment and the next angularly rearwardly vane.

The above described compression, combustion and exhaustion phases of a thermodynamic cycle are simultaneously taking place on the opposite side of the rotor in the same manner.

The structure of the first embodiment having been described, the structure of the second embodiment 110 will now be set forth. The embodiment 110 includes a housing 111 having a hollow interior 114, said housing being secured to a mounting member 112.

Rotatably mounted in the housing is a power member generally designated 116. End walls 117 are secured to the rotor and are in rotating sealing engagement with the housing similarly as that of embodiment 10. Extending axially outward from each end wall is a hollow shaft 118 that may be journalled for rotation about a rotary axis E in the same manner as that described with respect to embodiment 10.

The power member 116 includes a rotor 120, said rotor at one axial end being fixedly secured to one of the end plates 117 and at the other axial end being fixedly secured to the other end plate. A pair of diametrically opposed radial extending grooves 122, 123 are formed in the rotor member to extend the axial length thereof and are co-extensive with grooves (not shown) formed in the end plates. Vane 125 is slidably retained within the grooves 122 and the end plate grooves, while vane 126 is slidably retained in groove 123 and respective end plate grooves. The vanes are generally of the same construction as that described in respect to the first embodiment. That is, each vane includes a vane bar 128 having a leading surface 128a and a lagging surface 128b and a roller bearing 129 rotatably retained in a recess 130. The roller bearing in conjunction with the vane bar forms the lubrication channel 131 in the recess 130 that extends the axial length of the vane bar. The lubrication channel is connected through channel 132 to the hollow interior 133 of the shafts, each channel 132 being formed in the vane and end walls similarly as that illustrated in FIGURE 4 for the first embodiment. The inner peripheral wall of the housing is shaped so that in conjunction with the rotor, it forms two separate and distinct chambers, chambers 134 and 135, respectively. That is, the rotor along radial plane line K–E forms a fluid seal with the housing at 111a and along radial plane H–E forms a fluid seal with the housing at 111b. An intake port 137 opens into the chamber 134 adjacent to the housing portion 111a, said intake port being connected to the intake portion of manifold 140 which in turn is connected to a fuel induction system (not shown) of the nature described relative to the first embodiment. The exhaust port 138 opens into the chamber 135 on the opposite side of portion 111a from the intake port but closely adjacent thereto, said exhaust port being connected to the exhaust portion of manifold 140.

A slot 141 is formed in the housing slightly in advance of 111b (in the direction of rotation of the rotor-arrow 141) to have the roller bearing holder 144 of the transfer mechanism 142 slidably retained therein. Rotatably retained in the recess formed in the holder is a roller bearing 143, said bearing being located to form a fluid seal with the rotor. The roller bearing and roller bearing holder are cammed to a retracted position through lifter mechanism 145 that has cam followers (not shown) that ride in the cam track 152 formed in the respective end plate. The lifter mechanism, the roller bearing and roller bearing holder are preferably of the same construction as that described with respect to FIGURE 3.

An opening or ignition space 147 is formed in the housing intermediate portion 111b and the roller bearing holder 144. A spark plug 148 or other appropriate ignition means is mounted in the housing to extend into the ignition space and is connected through structure (not shown) to be timed by the rotation of the rotor member to ignite the combustible material at the appropriate portion of the thermodynamic cycle.

The portion of the housing between radial planes G–E and H–E, and planes H–E and J–E form an abutment 146, the portion between the radial planes G–E and H–E forming the lagging surface 150 of the abutment while the portion between the radial planes H–E and J–E form the leading surface 151 of the abutment. The remaining portion of the housing forms the separator 154. In order to permit the working substance that is compressed between the leading surface 128a of the vane and the lagging surface 150 of the abutment, the rotor is recessed at 153 just in front of the respective vane. The recess 153 in conjunction with the ignition space 147, the roller bearing 143 and roller bearing holder 144, and the lifter mechanism cooperatively act to transfer the working substance from the leading surface of a vane to the lagging surface thereof. That is, as the vane 125 is rotated about axis E from the position illustrated in FIGURE 6 in the direction of arrow 141, the working substance is compressed since the lagging surface of the abutment curves inwardly in the same direction to be more closely adjacent the rotary axis E. At the same time the roller bearing 129 is held in fluid sealing engagement with the inner surface of the housing due to the resilient action of the coil springs 158, the coil springs being mounted in the groove 122 similarly as the coil springs 76. As vane 125 approaches the housing portion 111b the coil springs 157 acting against holder 144 force the roller bearing 143 into the recess 153. As a result the working substance is compressed into the ignition space 147. As the roller bearing 129 moves angularly past the roller bearing 143, the lifter mechanism 145 due to the contour of the cam tracks on the end plates (only one being shown) retracts the roller bearing holder and roller bearing 143 into the slot (in the direction of arrow 149). At this time a spark is delivered at the spark plug 148, the timing of the spark being controlled through a distributor which is operated through timing mechanism (not shown) controlled by a rotation of shaft 118.

The vane 126 likewise is resiliently retained in abutting engagement with the inner peripheral wall of the housing through coil springs 157 mounted in the groove 123 and performs the same functions as vane 125 except 180° later.

Since the function of the various structural members of the second embodiment is very similar to that of the various embodiments other than the number of members and the configuration of the cam tracks, the interior of the housing and etc. which are varied to provide two complete thermodynamic cycles instead of, for example, eight for each 360° rotation of the rotor of the first embodiment the structure of the second embodiment will not be further described.

Figure 8:
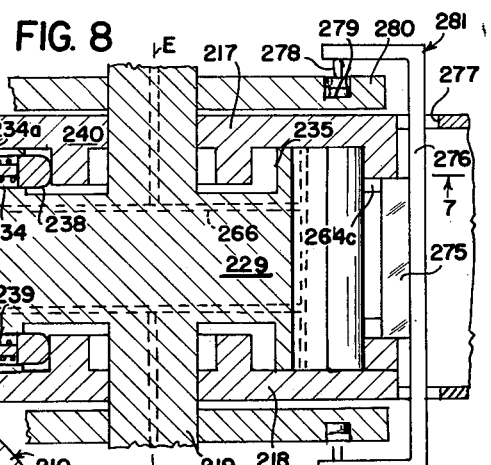
FIGURE 8 is a cross sectional view of the third embodiment of the invention that is taken generally parallel to the axis of the rotation of the rotor member thereof, said view being taken along the line and in the direction of the arrows 8—8 of FIGURE 7.
Figure 7:
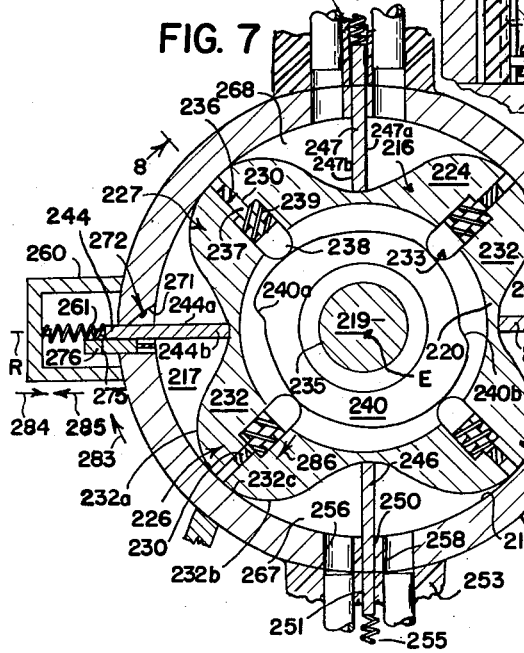
FIGURE 7 is a cross sectional view of the third embodiment of the heat engine of this invention, said view being generally taken along the line and in the direction of the arrows 7—7 of FIGURE 8.

The third embodiment of the invention, generally designated 210 and illustrated in FIGURES 7–9 inclusive includes a housing 211 having a hollow interior 214 and a power member 216 mounted to rotate about axis E in the direction of the arrow 283. An end plate 218 is fixedly secured to one end of the housing while the second end plate 217 is formed integral with the opposite end of the housing, it being understood that the end plate 217 may be a separate member fixedly secured to the housing. Shaft 219 extends through appropriate apertures formed in the end plates 217 and 218. The power member includes a rotor 229 formed integral with the shaft, said rotor being located within the interior of the housing and having axial end portions forming close fit with the adjacent end plates. Although the rotor is shown as formed integral with the shaft, it is to be understood that it may be a separate member sleeved in the shaft to rotate therewith. The rotor is configurated to provide vanes 224, 225, 226, and 227 which are equally angularly spaced relative to one another, as illustrated in FIGURE 7. An elongated groove 230 is formed in each of the vanes to extend the axial length thereof and to open to the inner peripheral wall of the housing. Each of the vanes has a radial extending aperture 234 located at either axial end thereof, each aperture at one end opening into the groove 230 and at the other end opening into an annular groove 235 formed at the respective axial end portion of the rotor.

Each of the vanes includes a main body portion 232 having a leading surface 232a and a lagging surface 232b and a shoulder surface 232c having approximately the same radius of curvature as the inner peripheral wall of the housing. The aforementioned groove 132 opens through the center portion of the shoulder 232c. A cammed vane portion 233 is slidably retained in each of the respective apertures 234 and grooves 230, said cammed vanes portion including a plunger bar 236 of approximately one half of the radial depth of the groove. Channels 266 are provided to extend through portions of the shaft and the rotor to provide for lubrication of the bars 276 similarly as the vane bars of the first embodiment are lubricated.

A pair of radial arms 237 are located in the respective pair of apertures 234 and at their ends are connected to plunger bar 236 and at their other ends are connected to the cam followers 238, each cam follower 238 being in part slidably retained in an aperture 23A. A coil spring 239 is positioned on each arm 237 to have one end thereof bear against a plunger bar and the opposite end bear against the shoulder 234a formed in the aperture to resiliently urge the cam follower portion 238 into contact with the somewhat annular cam 240 which is formed integral with the respective end plate to extend into the annular groove 235. The cam 240 is provided with a curved radially outward projecting offset 240a and a second offset 240b of similar configuration, the offset 240b being located diametrically across the shaft from the offset 240a. The offsets extend radially outwardly a sufficient distance from the general curved surface of the cam to move the cam follower portion, arms and plunger bar to position the outer surface of the plunger bar to be coextensive with the surface of the shoulder 232c. The purpose of providing the aforementioned offsets will become more apparent hereinafter.

In order to divide the space between the rotor and housing into four separate and distinct chambers, abutments 244 and 245, and separators 246 and 247 are extended through appropriate slots formed in the housing, said abutments and separators being slidably retained in said slots so that the abutments and separators will continually be held in sealing engagement with the rotor surface as the rotor rotates (except for the abutments when the transfer function takes place) even though the radial distance from the outer peripheral surface of the rotor to the rotor axis E varies. Each abutment has a leading surface 244a and a lagging surface 244b.

The separator 246 is slidably retained in the slot 250 formed in the housing, and the slot 251 formed in the manifold 253, the slot 251 in part being co-extensive with the slot 250. A pair of axially spaced, radially extending springs are located in the slot 251 to have the one ends thereof bear against the separator 246 and the opposite end bear against the manifold to constantly resiliently urge the separator to form a fluid seal with the rotor. The portion of the manifold 253 on one side of the slot 251 forms an exhaust portion of the manifold and on the opposite side of the slot forms an intake manifold. An intake port 256 is formed in the housing to place the intake portion of the manifold in fluid communication with the interior of the housing. The exhaust port 258 is located on the opposite side of separator 246 from the intake manifold and places the interior of the housing in fluid communication with the exhaust portion of the manifold.

A separator 247 having a leading surface 247a and a lagging surface 247b is slidably retained in slot 250 of the housing and slot 251 of the manifold, the last mentioned slot and manifold being located diametrically across the rotor from the separator 246. Likewise an intake port is provided in the housing on one side of the separator 247 and the exhaust port is provided on the opposite side of the separator, the last mentioned port being located closely adjacent to the said separator and placing the interior housing in fluid communication with the respective intake and exhaust portions of the manifold. Coil springs 255 are located in the slot 251 to have one end thereof bear against the manifold and the opposite end bear against the separator 247 to constantly urge said separator into fluid sealing engagement with the rotor as it rotates.

Secured to the housing between the manifolds to be located along the radial plane N–E is a housing member 262. A slot 264 is formed in the housing to have the abutment 244 slidably retained therein. Coil springs 266 having the one ends thereof secured to the housing member wall 262a and the opposite ends secured to the outer edge of the abutment to constantly urge the inner edge of the abutment into fluid sealing engagement with the rotor. Portions of the housing member and the housing form tongues 262b and 263b respectively that extend into appropriate radial grooves 245a formed at either axial end of the abutment to preclude the abutment being moved in other than a radial direction.

A housing member having a slot formed therein is mounted on the housing diametrically opposite the first mentioned housing member. An abutment 244 is resiliently retained in fluid sealing engagement with the rotor by coil springs that are located in the slot to bear against the housing member similarly as described heretofore.

The abutments and separators divide the space between the inner peripheral wall of the housing and the outer peripheral surface of the rotor into four separate and distinct chambers, chamber 267 being located intermediate separator 246 and abutment 244, chamber 286 being located intermediate abutment 244 and separator 247, chamber 269 being located intermediate separator 247 and abutment 245, and the chamber 270 being located intermediate the abutment 245 and the separator 246. An opening or ignition space 271 and a spark plug 272 or other conventional igniting means mounted in the housing wall to extend into said space, is provided in the housing wall adjacent the abutment 244 to open into the chamber 268. Likewise an ignition space 273 and a spark plug 274 mounted in the housing wall to be extended to the ignition space is provided, said space 273 opening into the chamber 270 adjacent the leading surface of abutment 245.

The slot 264 on the side opposite the ignition space 273 has a portion 264b of reduced axial length into which the plunger 275 slidably extends. The portion of the housing forming the slot portion 264b has tongues 264c extending into grooves 275a on either axial side of the plunger to insure that the plunger moves only in a radial direction. The outer edge of the plunger is secured to the web portion to the generally U-shaped lifter bar 276 of the lifter mechanism 281, said bar extending axially in either direction through an opening 277 formed in either end wall of the housing member 262d. Each leg of the U-shaped bracket has an axially extending cam follower member 278 secured therein, the cam follower member extending into the cam track 279 formed in the cam 280 that is fixedly secured to the shaft to rotate therewith. As may be apparent from FIGURE 8, the end walls 217, 218 are stationary relative to the housing while the cams are separate members mounted on the shafts on the opposite sides of the end walls from the rotor.

In the third embodiment of the invention, the leading surface 232a of, for example, vane 226 compresses a working substance between the leading surface 232a of the vane and the lagging surface 244b of the abutment 244 as the vane moves from the position illustrated in FIGURE 7. As a result of the vane 226 being rotated in the direction of arrow 283, the working substance is forced into the slot 264b between the plunger 275 and the vane 226. The vane continues to rotate and subsequently the groove 230 is placed in fluid communication with the slot 264b. At this time the plunger is moved in a radial inward direction through the action of cams 280 to force the working substance into a groove 230, it being noted that the inner end of the abutment 244 bears against the shoulder 232c of the vane. That is prior to the time that the groove 230 is moved past the position that it is in fluid communication with the portion of the slot in which the plunger 275 is mounted, the plunger is moved to have its inner edge substantially co-extensive with the inner peripheral wall of the housing.

Immediately after the vane 226 has been moved a sufficient angular distance so that a portion of the groove opens into the chamber 268, the cam follower 238 starts to ride up on the offset 240a. This forces the bar 236 in radial outward direction (arrow 285) and thereby forces the working substance out of groove 230 and into the ignition space 271. It is to be noted that the circumferential length of the shoulder 232c is sufficient to insure a fluid seal extending from counterclockwise edge of the recess 264b to the clockwise edge of the recess at the time the abutment 244 is aligned with groove 230.

After the vane 226 has been rotated sufficiently so that the working substance in the recess is transferred to the ignition space 271 a spark is provided at 272 due to the connection of the spark mechanism through appropriate coil and distributor means that is timed by the rotation of the shaft, the last mentioned structure being similar to that illustrated in FIGURE 3. The expansion of the combustion products causes the vane 226 to continue to rotate in the direction of the arrow 283 since the expansion takes place between the leading surface 244a of the abutment 244 and the lagging surface 232b of the vane 226. After expansion of the working substance takes place it is then swept through the exhaust port by the action of the following vane 225.

It is to be understood that at the time of the firing of the spark at 272 that a spark is likewise provided at 274 to ignite the combustion working substance in chamber 270. As a result the radial components of forces exerted on diametrically opposed portions of the power member tend to dampen the vibration of what would otherwise occur if firing took place on only one side of the rotor at any given time.

The third embodiment of the invention having been described, a description of the fourth embodiment will now be set forth. The fourth embodiment of the invention, generally designated 310, and illustrated in FIGURE 10, includes a housing 311 mounted on a motor mount 312. Journalled for rotation within the hollow interior 314 of the housing to rotate about axis E is a power member 316. The power member includes a rotor 320. The rotor may be formed integral with the shaft 322 such as illustrated with respect to the third embodiment, or it may be formed as a separate member sleeved on the shaft to rotate therewith. At either axial end of the rotor, the shaft 322 extends outwardly through appropriate apertures formed in an end wall 317 that is located at either axial end, the end walls being fixedly secured to the housing as to be mounted stationary relative to the housing. Each end wall is provided with a cam 328 that extends into the general annular groove 329 formed at either axial end of the rotor similarly as the third embodiment.

The rotor is configurated to form diametrically opposed vanes 320a and 320b, the vane 320a as illustrated in FIGURE 10 being located on the left-hand side of the plane T–E–V and the vane 320b being located on the right-hand side of said plane. Each of the vanes has a leading surface 320c, a lagging surface 320d and a shoulder portion 320e that is of a substantial circumferential length that forms a close fit throughout its length with the inner peripheral wall of the housing. Each of the vanes is provided with a groove 330 of substantially the same shape as the groove 230 of the third embodiment. Located within the groove to be moved alternately in the radial direction of arrow 331 and in a direction opposite arrow 331 is a plunger bar 332. An arm 333 at one end is connected to the plunger bar and at the opposite end is connected to the cam follower portion 334, said bar and cam follower portion being located in an opening that extends from the groove to the annular groove 329. A coil spring 335 is positioned on the arm to have the inner end thereof bear against the shoulder surrounding the opening and the opposite end bearing against the cam follower 334 to constantly resiliently retain the cam follower in engagement with the cam. Likewise an arm 333, a coil spring 335 and a cam follower portion 338 is connected to the opposite axial end of the bar 332, said members (not shown) being of similar construction as the camming vane portion of the third embodiment. The cam is provided with an outwardly radially extending offset 28a that extends a sufficient distance radially outwardly to force the outer edge of the bar 332 to a position to be substantially co-extensive with the surface of the shoulder 320e.

Mounted on the housing to substantially enclose the slots 341, 342 formed in the housing wall is a housing member 340. The slots 341, 342 are in part co-extensive. Slidably retained in the slot 342 is an abutment 343 that at either axial end has a groove to receive the tongue (not shown) of the housing. The abutment has a leadway surface 343a and a lagging surface 343b. The coil springs 344 at their one ends bear against the outer wall of the housing member and at the opposite ends bear against the abutment to resiliently retain it in engagement with the rotor. Slidably retained in the slot 341 is a plunger 347 that at each axial end has a groove to receive tongue 341a. Lifter mechanism 349 is secured to the outer edge of the plunger and has radially inwardly extending legs (not shown) with the cam followers mounted thereon to ride in the cam tracks of cams fixedly secured to shaft 322 such as that illustrated in the third embodiment. On the opposite side of the abutment 343 from the plunger 347 there is formed in the housing an ignition space 351. A spark plug 352 or other appropriate ignition means is located in the housing to extend into the ignition space, the ignition means 352 being connected to conventional mechanism (such as illustrated for the first embodiment) for timing the spark. The structure of the housing member, the lifter mechanism 349, the plunger 347, the abutment 343, and the slots in which members 347, 343 are located is substantially the same as that of the corresponding members of the third embodiment and therefore will not be further described.

Mounted on the housing on the side diametrically opposite the housing 340 is the housing member 356. A separator 358 having a leading surface 358a and a lagging surface 358b extends through the slot 357 formed in the housing to have one end thereof located within the interior of the housing member 356 and the opposite end bear against the rotor. A spring 359 at either axial end of the member 356 has one end secured to the separator to resiliently retain the separator in engagement with the rotor to form a fluid seal therewith. The separator has grooves (not shown) to receive the tongues extending into slot 357 to prevent other than radial movement of the separator. An intake port 360 is located on one side of the separator to place the intake portion of the manifold (not shown) in fluid communication with the chamber 362 formed in the housing to the left of the abutment 343 and separator 358 (as viewed in FIGURE 10). On the opposite side of the separator from the intake port and closely adjacent to the separator is an exhaust port 361 that places the exhaust portion of the manifold (not shown) in fluid communication with the chamber 363 to the right of the separator and the abutment. The fourth embodiment operates similarly as the third embodiment other than only one-fourth of the number of thermodynamic cycles take place for each 360° rotation of the power member.

The fifth embodiment of this invention, generally designated 375 and illustrated in FIGURES 11 and 12 includes a refrigerating machine, generally designated 376, and a driving engine, generally designated 377, mounted on a base 378. The driving engine is preferably of the same construction as one of the embodiments of the invention described heretofore.

The refrigerating machine 376 includes a housing 380 having a hollow interior 381 that is of substantially the same configuration as the first embodiment of the invention. Mounted in the housing to rotate about axis E in the direction of arrow 382 is a power member 383 that is preferably of the same construction as the power member of the first embodiment. The power member 383 includes a rotor 384 having equally angularly spaced vanes 385, 386, 387 and 388 mounted for slidable movement in a radial direction relative to the rotor axis E to substantially continuously form a fluid seal with the inner peripheral wall of the housing, said vanes extending into vane slots 390c. Each of the aforementioned vanes has a leading surface 390a and a lagging surface 390b and includes a bar 390 that rotatably mounts a roller bearing 391, said bar and roller bearing constantly being urged to bear against the housing by coil springs 392. A recess 393 is formed in the rotor adjacent or ahead of each of the bars 390.

The shaft 394 extends axially outwardly beyond end wall 395 and is connected through a connecting member 396 to a shaft 397 of the drive engine to rotate therewith. Shaft 394 is either secured directly to the rotor to cause it to rotate or to the end wall which in turn is secured to the rotor in the manner previously described.

Formed on each of two diametrically opposed sides of the housing is an intake port 410 and an exhaust port 411 that place the respective chambers 415, 416, 417 and 418 formed within the housing into fluid communication with the appropriate portions of the manifolds 412 that are secured to the housing. The housing has a portion 380a that along the axial length thereof abuts against the rotor to form a fluid seal therewith to separate chamber 415 from chamber 416, the portion 380a being located between the inlet port 410 and exhaust port 411. Likewise the housing along an axially extending portion 380b abuts against the rotor member between the opposite intake port and exhaust port to separate the chamber 417 from chamber 418. The abutment 412 of the housing along an axially extending portion 380c abuts against the rotor member to separate chamber 416 from chamber 417 while the abutment 413 of the housing along an axially extending portion 380d bears against the rotor to separate chamber 418 from chamber 415.

A space 405 is formed in the housing just ahead of portion 380c to have the gas or working substance compressed thereinto, space 405 being of the same shape as the ignition space in the first embodiment. It is to be noted that there is no ignition means that extends into space 405. Likewise the housing has adjacent axial portion 380d a recess 406 of the same shape and performs the same function as the recess 405.

As diagrammatically represented in FIGURE 12, cooling coils 423 are located within a section of the housing between radial planes AA–E and radial planes BB–E. The cooling coils 423 have an inlet 423a that is closely adjacent the slot 401 and an outlet 423b adjacent the intake port 410. Likewise cooling coils 424 are formed in the section of the housing between the radial line DD–E and radial line CC–E. The cooling coils 424 have an inlet 424a closely adjacent the slot 401 and an outlet 424b closely adjacent the intake port. It is to be understood that the cooling coils 423, 424 may be in the form of a cooling jacket, or may be replaced by fins for air cooling of the system as it is passed through said chambers 416 and 418 respectively.

Formed in the housing between the radial plane CC–E and radial plane BB–E are refrigerating coils 427 that have an inlet opening 427a closely adjacent the exhaust port and an outlet opening 427b closely adjacent the slot 401 but on the opposite side of said slot from the inlet opening port 423a of the cooling coils 423. Likewise in the housing diametrically across the rotor from the refrigerating coils 427 there is provided refrigerating coils 428 that have inlet opening 428a closely adjacent the exhaust port and an outlet opening 428b closely adjacent the slot 401 but on the opposite side thereof from the cooling coil inlet opening 424b.

In each of the slots 401 there is provided a transfer mechanism that includes a roller bearing holder 403 and a roller bearing 404 mounted in the recess of the holder similarly as has been described for the first embodiment. Likewise lifter mechanism 409 is connected to the roller bearing holder 403 to move it and the roller bearing in a radial direction at the appropriate time in the manner described for the first embodiment, the lifter mechanism being cammed by cam tracks formed on the end plates if the end plates are rotatable relative to the housing as is the case of the embodiment illustrated in FIGURES 11 and 12 or by cams fixedly secured to the shafts if the end plates are stationary relative to the housing.

Referring now to FIGURES 13, 14 there is illustrated a sixth embodiment of this invention. The sixth embodiment, generally designated 450, includes a driving engine 452, which may be of the construction of any one of the first four embodiments described heretofore. The driving engine is connected to a drive shaft 453 to the shaft 455 of the direct thrust heat engine, generally designated 456, by mechanism not shown. The output of the direct thrust engine is conducted through a conduit 458 to the thrust mechanism 459 which is to be operated thereby.

The direct thrust engine 456 may be of the same construction as that described relative to the first embodiment other than for the difference of structure that will be noted hereinafter. The engine 456 includes a housing 461 mounted on a motor mount 462. Mounted for rotation within the housing interior 464 to rotate about the axis E in the direction of arrow 465 is a power member 463. The power member has a shaft 466 secured to one axial end thereof to extend through an appropriate aperture formed in the end plate 467 which as illustrated is formed integral with the housing 461. However, it is to be understood that the end plate may be a separate entity that is fixedly secured to the housing by, for example, cap screws. The shafts 455, 466 are journalled for rotation in spiders (not shown) that are mounted on the housing. The aforementioned shaft 465 at one end is fixedly secured to the opposite axial end of the rotor and has an end plate 468 keyed thereto to rotate therewith, the end plate 468 forming a fluid seal with the housing.

Four equally angularly spaced vanes (only two of which are illustrated, i.e. vanes 470, 471) are mounted in rectangular slots 473 for slidable radial movement therein and each vane has a leading surface 474a and a lagging surface 474b. The rotor has a recess 469a adjacent the leading surface of each vane. The vanes are constantly urged toward a fluid sealing engagement with the inner peripheral wall of the housing by coil springs 472 and each vane includes a vane bar 474 and a roller bearing 476.

The housing includes an abutment 475 that forms a fluid seal with the rotor along an axially extending portion 475a and that has a lagging surface 475b and a leading surface 475c. A slot 477 is formed in the abutment 475 forwardly of the axial line 475a to have transfer mechanism 478 located therein. The transfer mechanism includes a roller bearing 480 rotatably retained in the roller bearing holder 481. Lifter mechanism 485 that includes arms 482 secured to the roller bearing holder and extended outwardly through the appropriate aperture formed in the housing and a generally L-shaped bracket 483 is provided to move the transfer mechanism in a radial direction at the proper times in the thermodynamic cycle. Ends of the arms 482 are secured to one leg 483 of the L-shaped bracket 483 while the cam follower 486 is mounted in the opposite leg of the bracket to ride in the cam track 487 formed in the end plate 468. Coil springs 488 are positioned on the arm 482 to have one end thereof bear against the bearing holder 481 and the opposite end abut against the outer wall of the slot 477.

An ignition space 491 is formed in the abutment 475 between the axially extending surface 475a and the slot 477, there being a spark plug 491 mounted on the housing or other ignition means extending into the ignition space. The ignition means is connected to appropriate mechanism (such as described with respect to the first embodiment) to be properly timed to ignite the combustible working substance located in the space.

Diametrically across from the abutment 475 the housing is provided with a second abutment 493 that forms a fluid seal with the rotor along an axially extending surface 493a. Located within the abutment 493 are transfer mechanism, an ignition space (opening) and ignition means similarly as that disclosed with respect to the abutment 475.

The housing also includes a separator 495 that forms a fluid seal with the rotor along an axial surface 495a and a second separator 496 diametrically across from the rotor 469. The separator forms a fluid seal with the rotor along an axially extending surface 495a to separate chamber 498 from the chamber 499 while the abutment 475 separates the chamber 499 from the chamber 500 along the axially extending surface 475a. Chamber 500 is separated from the chamber 501 by the abutment bearing against the rotor along the axially extending surface 496a while the chamber 501 is separated from the chamber 498 by the abutment 493 bearing against the roller along the axially extending surface 493a. It is to be noted that an intake port 502 opens into the chamber 501 adjacent the axially extending surface 496a to place the chamber in fluid communication with an intake manifold 504 which in turn is connected to a fuel induction system or carburetor. Likewise an intake port 503 places the chamber 499 in fluid communication with an intake manifold 504 on the housing. It is to be noted that the housing is not provided with exhaust ports of the nature disclosed for embodiments illustrated in FIGURES 1–10.

The working substance is compressed in a chamber 499 and then transferred into the ignition space and ignited similarly as that described in respect to the first embodiment. However, when the vane moves past the transfer mechanism it is not permitted to move radially outwardly in the manner described in respect to the first embodiment. Rather there is provided a cam track 506 which is formed integral with the stationarily positioned end wall 467, to retain the vanes in the position such as illustrated in FIGURE 14 with respect to vane 471. Since none of the force produced by the expansion of the working substance is exerted against the lagging surface of a vane, it is necessary that the rotary driving force be furnished by the driving engine 452.

The working substance that is ignited in the ignition space 490 expands axially through the opening 507 formed in the conduit 458 and in the end wall so as to transfer the thrust to the thrust operated mechanism 459. It is to be noted that a second opening 507 is provided in the end wall adjacent the rotor on the diametrically opposed side thereof from the vane 471. The thrust transferred through the last mentioned opening 507 may be imparted to the same thrust mechanism 459 or to separate mechanism (not shown).

The seventh embodiment of the invention, generally designated 525 and illustrated in FIGURES 15 and 16 includes a housing 535 having a hollow interior 536, said housing being mounted on the engine mount 529. Mounted in the housing to rotate about axis E in the direction of the arrow 526 is a power member 537 that includes a rotor 538. At one axial end of the rotor an end plate 539 is formed integral therewith, an outer peripheral portion of the end plate being in rotating sealing engagement with the shoulder portion 535a of the housing 535. A shaft 528 is formed integral with the rotating end plate to extend axially therefrom and is journalled for rotation in a spider (not shown) secured to the housing. A shaft 540 is formed integral with the opposite end of the rotor and extends through an appropriate aperture formed in an end plate 541 that abuts against the axial end of the rotor, the end plate 541 being formed integral with the housing. It is to be understood that the end plate 541 may be formed as a separate member and fixedly secured to the housing so that it does not rotate with the rotor.

Four equally spaced, radially extending grooves 544 are formed in the rotor to have a vane slidably retained in each of the grooves, only vanes 545 and 546 being illustrated. The vanes are of the same construction as that described with respect to the first embodiment other than that they are of an axial length to abut against the fixed end plate and extend into grooves of the rotating end plate. That is, each vane includes the roller bearing 543, a vane bar 542, and has a leading surface 542a and a lagging surface 542b. A pair of coil springs 549 are mounted in each groove to resiliently retain the respective vane in fluid sealing engagement with the inner peripheral wall of the housing.

The housing includes a pair of diametrically opposed separators, i.e. separators 547, 548. Each of the separators along the axially extending surfaces 547a and 548a respectively form a fluid seal with the rotor other than when a recess 538a which is formed adjacent each vane surface 542a is adjacent to said axially extending surface. On the side of the axially extending surface in the direction of rotation of the rotor there is formed an intake port 550 and on the opposite side of the respective axially extending surface is an exhaust port 551. The intake port and exhaust port one one diametric side of the rotor open into the respective intake and exhaust portions of manifold 552 mounted on the housing while an intake port and exhaust port correspondingly open into a manifold on the opposite side of the housing. The aforementioned manifolds may be of the construction described with respect to the first embodiment.

The housing also includes abutments 553, 554, one abutment being located on each side of the housing between the aforementioned separators 547 and 548. Each abutment has a lagging surface 554b and a leading surface 554a. Likewise each abutment has a slot 555 formed therein for mounting the transfer mechanism 556. The aforementioned transfer mechanism is generally of the same construction as that described with respect to the first embodiment and includes a roller bearing that in conjunction with the roller bearing holder forms a lubrication channel 559 that extends through the lifter mechanism, generally designated 560, to an external source of lubricating material. The lifter mechanism includes a pair of axially spaced radially extending arms that extend through appropriate apertures formed in the housing and are connected to a lifter bar (not shown) having a pair of radially extending legs. In one of the legs is an axially extending cam follower 565 that rides in the cam track 542 formed in the end plate 539, while a second cam follower is mounted in the opposite leg to ride a cam track (not shown) formed in cam 567 that is mounted on shaft 540 to rotate therewith. The cam 567 may be of the construction as that illustrated in FIGURE 8.

Each of the abutments has a portion along an axially extending surface 554c that forms a fluid seal with the rotor. An ignition space (opening) 569 is formed in the housing between portion 564c and the slot 556, there being a spark plug 570 or other appropriate mechanism mounted in the housing to extend into the ignition space for igniting the combustible materials of the working substance. The spark plug is connected through means (not shown) of the nature illustrated with respect to the first embodiment for properly timing the spark.

A pair of valve openings 574 are formed in the end wall 541, there being a valve opening adjacent each of the transfer mechanisms. Each valve opening is of the size and located to be closed by the transfer mechanism when it is in a datum position as illustrated in FIGURE 15. However, upon transfer mechanism being retracted the opening 574 opens into chamber 580 formed in the housing between the radial planes HH–E and JJ–E, while the second valve opening (not shown) located slightly in advance of plane GG–E opens into chamber 578 when the transfer mechanism is retracted.

The aforementioned separators and abutments in conjunction with the rotor separate the hollow interior of the housing into four chambers, chamber 577 being located between the axially extending surfaces 547a and 554c, the chamber 578 being located between the axially extending surfaces 554c and 548a, the chamber 579 being formed between the axially extending surfaces 548a and the axially extending surface that is formed adjacent the valve opening illustrated in FIGURE 15, while chamber 580 is formed between the axially extending surface that isn't shown, and the axially extending surface 547a. As each vane is rotated through the chamber it separates the chamber into two spatial regions that vary in capacity as the vane is moved angularly therethrough. As for example in the chamber 577 the spatial region 577a clockwise of vane 545 illustrated goes from maximum to zero while spatial region 577b on the opposite side of the vane goes from zero to a maximum (the first spatial region being the leading spatial region and the latter spatial region being the lagging spatial region). Each of the valve openings open into a line 533 as connected to the aforementioned variable valve 530. The valve control system 534 controls the opening of the variable valve whereby the desired amount of power output of the heat engine is retained within the heat engine to rotate the rotor while the remaining power output is passed through the valve to the thrust mechanism 531 to be utilized as direct thrust. By appropriately adjusting the variable valve, a setting is obtained to obtain the maximum thrust output while at the same time running the heat engine at its desired operative condition.

The eighth embodiment of the invention, generally designated 600, includes a housing 601 having a hollow interior 603 (see FIGURES 17–19). A power member 602 is located in the hollow interior to rotate about axis E and includes a rotor 604. An end plate 610 is secured to either axial end of the rotor. Each end plate forms a fluid seal with the shoulder portion 601a of the housing and is rotatable relative to the housing.

The power member 602 also includes vanes 612, 613 and two other vanes that are not illustrated. The vanes have a leading surface 612a and a lagging surface 612b. Each of the end plates, the rotor, and the vanes are of the same construction as the respective portions of the first embodiment other than the cam tracks that are provided on the end walls and the rotor 602 does not have a recess adjacent the leading surface of each of the vanes. The construction of the cam tracks of the eighth embodiment will be set forth hereinafter. That is, each of the vanes includes a vane bar and a roller bearing that in combination with the bar forms a lubrication channel, there being coil springs located in the grooves 604 and 605, respectively of the roller to resiliently retain each roller bearing in engagement with the inner peripheral wall of the housing.

The housing includes a separator 620 and a second separator 621 diametrically across the rotor from separator 620. Each of the separators has an exhaust port and an intake port formed therein that are placed in fluid communication with appropriate manifold portions of a manifold of the same construction as that described with respect to the first embodiment. The housing 601 likewise includes an abutment 623 having a leading surface 623a, a lagging surface 623b and a portion 623c along the axial length thereof that forms a fluid seal with the rotor. There is also a second abutment (not shown) on the opposite side of the rotor from abutment 623. The second abutment and the structure mounted thereon is the same as that described with respect to the abutment 623, and therefore it will not be separately set forth.

The abutment 623 is provided with an axially extending generally cylindrical transfer chamber 625 that in part is enclosed by the portion 623c. On opposite sides of the cylindrical chamber and generally concentric therewith are the axially extending slots 626, 627 respectively, said slots being arcuate in cross-section perpendicular to the rotor axis E and extending approximately a third of the circumference of an annular slot. Each of the slots 626 and 627 open to the hollow interior of the housing on opposite sides of the portion 623c, the slot 626 opening at 628 to the chamber 625 while the slot 627 opens at 629 to the same chamber. Slidably mounted in the slot 626 is an axially extending arcuate bar 632 while in the slot 627 there is an arcuate bar 633, bars 632 and 633 being of the same shape but oppositely spaced. The inwardmost edge of the bar 632 is shaped to form a continuation of the surface of the lagging surface 623b when it is in its radial inwardmost position (as illustrated in FIGURE 17) while the corresponding edge of the bar 633 is shaped to form a continuation of the leading surface 623a when it is in a similar position. A linkage 635 is pivotally connected at 639 to bar 632 at either axial end thereof while the opposite end of each of the linkages is pivotally connected at 637 to an arm 636. Each of the arms 636 is at its opposite end secured to the web portion of the generally U-shaped lifter bracket 638. Each of the legs of the bracket 638 has an axially inwardly extending cam follower 640 mounted therein to ride in a cam track 641 formed in the end walls 610. It is to be mentioned that a generally radially extending opening is formed in the housing to permit mounting of the arms 636 and the linkage 635, the size of the opening mounting the arm permitting only radial movement thereof while said opening is enlarged for mounting linkages 636 to permit both radial movement and swingable movement about the pivots 638 and 637 as the arcuate bar is retracted and advanced. Likewise linkages 635 are pivotally connected to the opposite axial ends of the bar 633, the ends of the linkages in turn being pivotally connected to the one ends of the arms 636. The opposite ends of the mentioned arm 636 are fixedly secured to the web portion of the generally U-shaped bracket 644. The opening in which the arm and linkages are extended are of the same construction as that described heretofore with respect to the arms and linkages connected to the bracket 638. The bracket 644 has in its outer legs axially extending cam followers 645 that ride in cam track 646 formed in the respective end plates. As may be noted in FIGURE 18, cam track 646 is of a smaller perimeter than that of 641 and therefore the legs of bracket 644 are correspondingly longer than the legs of bracket 638.

The cam track 641 is provided with four radially outwardly projecting offsets 641a, each offset being located axially outwardly of the respective vane and slightly angularly in advance of the vane. As the rotor rotates to an angular position to place the leading surface of, for example, the vane in 612 slightly rearwardly of the arcuate bar 632, the cam follower 640 starts to ride up on the offset and thereby moves the U-shaped bracket 638 radially outwardly (in the direction of arrow 616) from the rotor axis E. The movement of the U-shaped bracket in turn is transmitted through pivot 637 and pivot 639 to the linkage 635. Due to the provisions of the pivots 637 and 639, the linkage may pivot about pivot 637 whereupon pivot 639 may move in a clockwise direction as viewed in FIGURE 17 and at the same time due to the pivot 639 the arcuate bar may follow the curvature of the slot 626. The retraction of the arcuate bar in slot 626 provides an opening between said arcuate bar and portion 623c whereby the working substance is forced through the opening 628 into the cylindrical chamber. Just prior to the time the surface of the roller bearing 614 is radially aligned with the lagging edge of the arcuate bar 632, the cam follower has moved off the offset 641a and as a result the arcuate bar 632 is again moved to a position illustrated in FIGURE 17. After the roller bearing 614 has been moved to a position slightly angularly in advance of the portion 623c the cam follower 645 rides up on the radially offset portion 646b of the cam track 646. The lifter mechanism 644 retracts the arcuate bar 633 into the slot 627 to permit the working substance to move out of the cylindrical chamber to expand between the abutment surface 623a and the lagging surface of the vane 612. At an angular time in advance of the arcuate bar 633 being moved toward a retracted position (arrow 616) a spark is produced at the spark plug 649 that is mounted in the housing (or by other ignition means) to have the spark gap portion extend into the cylindrical chamber, the spark plugs being connected to mechanism such as illustrated in the first embodiment for both providing and properly timing the spark. The expanding working substance continues to force the vane 612 in a forward direction until said vane has been moved sufficiently angularly in the direction 650 to uncover the exhaust port (not shown) formed in the housing. It is to be mentioned that the radial offset 646b is moved angularly past the cam follower 645 prior to the time that the angularly offset 641a initiates the opening movement of the arcuate bar 632 to permit the flow of working substance through the chamber 649 into the cylindrical chamber, the offset 646a being located radially inwardly of the offset 646b so that the bar 633 is in a "closed" position when the bar 632 is moved from a "closed" position. Due to provisions of the arcuate bars 632 and 633 and the mechanism for moving said bars, the rotor has not been provided with recesses in front of the vanes such as the recesses formed in rotors of the embodiments described heretofore.

As the rotor continues to rotate to bring the vane in groove 604 adjacent the right hand cam follower 640, cam follower 645 is moved inward by cam track 646 to cause the arcuate bar 633 to be moved to the position illustrated in FIGURE 17.

It is to be understood that a heat engine having the transfer mechanism and ignition space of FIGURES 17–18 may be used as a drive engine for either one of the embodiments of the invention illustrated in FIGURES 12 and 13.

For simplicity in setting forth the principles of operation of one embodiment of the heat engine, the vane 32 of the first embodiment illustrated in FIGURES 1–5 will be considered. As the primary angular motion of the vane 32 from a radial position sufficiently angularly advanced of the intake port 55 to preclude the movement of the working substance into the region between the leading surface of said vane and surface 60b, the first system of working substance in the space between radial line EF and radial line DE is compressed between the leading surface of the vane and the lagging surface 60b of the abutment. As vane 32 approaches the abutment 60 the working substance of the first system is forced into the recessed portion 90 of the rotor. That is, as vane 32 moves from radial line EF to radial line DE the working substance between the leading surface of vane 32 and the lagging surface 60b is compressed, and therefore the portion of angular movement from radial line EF and DE is the compression portion of the cycle.

During the compression portion of the cycle and before vane 32 has moved to position DE, the recess 90 is moved to a location to allow transfer of the compressed working substance into the ignition space 64. As the vane 32 proceeds to pass to the abutment at radial line DE the compressed first system is spatially isolated (in the ignition space) from the compression and expansion regions (chambers 47 and 48 respectively). Now the compressed system moves past the slot 66, the transfer mechanism 79 having been cammed through lifter mechanism 80 to a position to provide a recess. As the vane 32 passes the leading edge (in the direction of rotation) of the slot, the transfer mechanism is being retracted and due to the increasing space provided the gas expands into the spatial region between the leading surface 60c of the abutment and the lagging surface of the vane 32. Prior to allowing the system to expand in this region the spark mechanism provides a spark to ignite the first system. This causes additional expansive forces and thereby the working substance exerts a driving force against the lagging surface of vane 32 and the leading surface of the abutment. About the time vane 32 passes the radial line DE the leading surface of the vane 32 begins to sweep out the system of working substance in chamber 48 that in time precedes said first mentioned system (that is expanding out of the ignition space). It is to be noted that the region immediately leading the vane is isolated from the region immediately lagging the vane at all times with the possible exception of the time it passes the ignition opening, this isolation being accomplished by the sealing fit of the vane with the end walls, the rotor and the roller bearing 37 of vane 32 being continuously urged into contact with the abutment by spring 41.

As the compressed system is allowed to expand against the lagging surface of the vane 32, the prior system that leads the vane proceeds to be exhausted in the region of the path between the leading surface of the vane 32 and the lagging surface 51a of the separator 51 through exhaust port 53. This takes place as vane 32 moves from a position slightly angularly rearwardly of line DE to slightly rearwardly of radial line AE.

It is to be understood that the working substance of the aforementioned first system is induced or drawn into chamber 47 while vane 33 had previously moved from radial line FE to 90° past radial line FE. Also it is to be mentioned that as vane 32 is moved angularly through chamber 48, lifter mechanism 80 is cammed back to the position illustrated in FIGURE 2 to the time recess 90 adjacent vane 31 moves to a position in fluid communication with opening 64. As the cam follower passes through portion 86b of the cam track, the bearing 79 remains in fluid sealing engagement with the rotor.

As is apparent from the aforegoing description the vane has primary angular motion in the direction of the arrow 15 that is continuous as long as the rotor continues to rotate and auxiliary radial motion first in a direction opposite arrow 97 as it moves from radial line CE to the position illustrated in FIGURE 2 (line CE) then in the direction of arrow 97 as it moves to radial line DE, next again in a direction opposite arrow 97 as it moves to the position illustrated for vane 33 in FIGURE 2 (DE), and finally in the direction of arrow 97 as said vane 32 moves to radial line AE. The combined primary and auxiliary movement described in this paragraph generally corresponds to one thermodynamic cycle. The vane 32 likewise in moving through another 180° rotation from radial line AE constitutes a second thermodynamic cycle.

Since each of the other vanes of power member 16 likewise passes through two cycles for each 360° rotation of the power member the engine 10 is in effect an eight cylinder engine, each of the vanes 33, 30 and 31 having auxiliary motion in the direction of arrows 98, 95 and 96, respectively, as vane 32 moves in the direction of arrow 97. Also since for each portion of the first described thermodynamic cycle associated with vane 32, vane 30 is associated with a corresponding portion of a thermodynamic cycle but vane 30 is 180° displaced, any radial components of force that tends to cause vibration of the rotor are cancelled.

The operation of the second embodiment of the invention 110 (see FIGURE 6) is very similar to that described with respect to the first embodiment other than that due to the provision of only two vanes and a single abutment it is in effect only a four cylinder engine since for each 360 rotations of the power member 116, two thermodynamic cycles take place. That is, for example, when vane 125 moves from a radial position precluding the entrance of working substance from the intake port 137 into the spaial region of the chamber 117 between the leading surface 128a of the vane and the lagging surface 150 of the abutment, the system in said region is compressed and then the compressed working substance is forced into the ignition space 147 as the vane moves to radial line H–E. After the vane 125 is moved slightly past the line H–E, the lifter mechanism 145 is cammed through the cam track on the end walls to move in the direction (arrow 49) radially outwardly from the rotary axis E. This permits the working substance that was contained within the ignition space to expand between the leading surface of the abutment 150 and the lagging surface of the vane 125. At a time just prior to or substantially at the same time that the initial radial outward movement of the transfer mechanism 145 takes place, a spark is produced across the spark gap of the spark means 148. The combustion of the combustible products of the working substance imparts kinetic energy to said working substance and thereupon provides an additional expansive force against the lagging surface of the vane. At approximately 30° prior to vane 125 being rotated to radial line H–E, the system of working substance that is then between the lagging surface of the vane 126 and the leading surface of the abutment 151 is permitted to start to exhaust through the exhaust port 138 and when the vane 125 is at radial line HE it starts to sweep the last mentioned system out of chamber 135.

It is to be noted in connection with the embodiment 10 that as the vane 125 moves in the radial direction 58, the vane 126 moves in the radial direction 159, the radial movements of the vanes constituting the auxiliary motion of the vanes. Likewise as the vanes are rotated in the direction of the arrow 141, which constitutes the primary angular motion of the vanes, the auxiliary motion of the vane 125 between the radial line H–E and the radial line J–E is in the direction opposite arrow 58 while the auxiliary motion of the vane 126 between radial line K–E and radial line D–E is in the direction opposite arrow 159.

From the aforegoing description of the embodiment 10, it is believed that it is apparent that from every 360° rotation of the rotor 120, two complete systems separate and distinct from one another are at different time intervals passed through the intake port 137 and likewise two separate and distinct systems of working substance are exhausted through the exhaust port 138. It is to be understood that if only a single vane were provided on the rotor 120 that the heat engine would be operable, the primary difference being that only one thermodynamic cycle would be produced for each 360° rotation of the rotor.

In both the first and second embodiments of the invention, it is to be noted that each of the vanes has primary angular motion and auxiliary motion while the abutments are stationary. This is in contrast to the third and fourth embodiments, as will become apparent hereinafter, wherein the abutments have auxiliary motion and the vanes have primary angular motion and portions of the vanes have auxiliary motion in addition to primary angular motion.

For purposes of describing the operation of the third embodiment of the invention, one thermodynamic cycle will be considered (see FIGURES 7–9). During the time interval that the vane 227 is moving through the chamber 217, a first system of working substance is introduced into said chamber behind the lagging surface of the vane 227 as it moves past the intake port to a position that the abutment 244 is in contact with the juncture of the lagging surface and the shoulder of said vane 227. At this time the vane 226 has been sufficiently advanced through rotation in the direction of the arrows 83 to block the intake port 256. Subsequent primary angular movement of the vane 226 compresses the first system of working substance in 217 between the leading surface 232a of the vane 226 and the lagging surface 244b of the abutment 244. As the rotor continues to rotate, the inner edge of the abutment rides up (moves in the direction of arrow 285) on the leading surface of the vane 216 to provide a space of decreasing capacity and thereby force an increasing portion of working substance of the first system into the slot 264b in which the plunger bar 275 is located, the plunger bar at this time being in a retracted position in said slot as a result of the cam followers 278 riding in the cam track 279. When the vane 226 has been sufficiently angularly advanced for the abutment to ride on the shoulder 232c all the working substance has been compressed into said slot 264b.

Further movement of the vane 226 places the plunger bar slot in fluid communication with the groove 230. At this time the cam track is curved radially inwardly toward the rotary axis E to thereby cause the plunger bar 275 to be moved in the direction of the arrow 284 to force substantially all the working substance into the groove 230 prior to the time that the groove 230 is angularly moved to a position out of fluid communication with said slot. That is the plunger bar 275 is moved to be substantially co-extensive with the inner peripheral wall of the housing that partially forms the chamber 217 to force the first system into groove 230. It is to be mentioned that the circumferential thickness of the abutment 244 is greater than the corresponding circumferential dimension of the slot 230 to thereby preclude the abutment being forced into the slot through the action of springs 261, provided that the vane slot extends the length of the rotor. However, in the embodiments having cammed vane portions such as illustrated in FIGURES 7 and 10, it is not necessary that the vane slots and cammed vane portions extend the length of the rotor. Also, it is to be mentioned that at the time the abutment rides on the shoulder 232c the abutment has been then moved in the direction of the arrow 285 to its most retracted position.

As the leading edge of slot 230 passes the leading surface of the abutment, the cam follower 238 starts to ride up on the offset 240a of vane 226 to force the bar 236 in the direction of the radial arrow 286 to force the working substance out of the groove 230 and into the ignition space 271, the portion of the shoulder in advance of the slot 230 being of sufficient circumferential length to preclude the working substance being forced into the chamber 268 in advance of the leading surface 232a. By the time the lagging surface of the slot 230 is moved out of fluid communication with the ignition space, the bar 236 has been cammed to its outermost radial position (to have its outer edge substantially co-extensive with shoulder 232c) to have forced all the working substance out of the slot 230. At this time or at a slight angular time previously a spark is produced across the spark gap of the sparking means 272 to ignite the combustible products of the first system working substance in the space 271. Additional primary angular movement of the rotor moves the lagging surface 232b of the vane 226 to a position wherein the additional movement of the rotor results in the abutment riding on the lagging surface, the abutment then being forced in a radial inward direction (arrow 284) due to the action of the coil springs 261 to form a fluid seal with the lagging surface of the vane 226. At the same time the first system of working substance that was previously fully contained in the space 271 is permitted to expand into the spatial regions of the chamber 268 between the leading surface 244a of the abutment and the lagging surface 232b of the vane 226 that is within the chamber 268. This expansion forces vane 226 and thereby the rotor to rotate about axis E. Still further additional rotary movement of the vane 226 brings the juncture of the shoulder 232c and the lagging surface 232b to a position wherein the expanding system is permitted to exhaust through the port 256. At this time a portion of the leading surface of the vane 225 is moving into the chamber 268 and thereby aids in sweeping the expanded working substance through the exhaust port, the exhaustion of the system being completed at the time that the abutment 244 initially rides up on the shoulder 232c of the abutment 225.

At the same time as the first system is being introduced from the ignition space 271 into the chamber 268 a second system is being introduced from the ignition space 273 into the chamber 270. Likewise at the time that the first system is being ignited in the ignition space 271, the second system is being ignited in the ignition space 273. Thus it is apparent that two separate and distinct thermodynamic cycles are taking place in the same time interval and are simultaneously at the same point of sequential change in thermodynamic state of the respective systems but taking place on opposite sides of the rotor. Likewise corresponding thermodynamic cycles take place with respect to the vanes 227 and 225 but offset in time from the first and second system. It is believed that it is apparent from the aforegoing description that for every 360° rotation of the power member 216, eight separate and distinct thermodynamic cycles take place.

It is to be mentioned that at the time the leading surface 232a of the vane is moved to a position co-extensive with the radial line M-E the separator 247 starts to ride up on said leading surface against the resilient action of the springs 255 located in the manifold slot. Also it is to be mentioned that the circumferential thickness of the separator 247 is slightly greater than the circumferential dimension of the groove to thereby preclude the separator moving into said groove. During the interval of time that the lagging surface of vane 226 is in a radial position to be in engagement with the separator 247 the springs 255 force the inner edge of the separator into fluid sealing engagement with said lagging surface of the vane.

During the interval of time that the vane 226 is moving from a position wherein groove 230 is being moved past the ignition space the cam track 240 is curved radially inwardly to retract the camming vane portion in a direction opposite the radial arrow 286 so that said portion is fully retracted prior to the time that the groove is brought to a position to be in fluid communication with the slot 264b located along a radial line N-E. Thus another system of working substance may be transferred onto latter said groove.

From the preceding description of the operation of the third embodiment, it is believed that the operation of the fourth embodiment 310 is obvious. However, it will be mentioned that for the rotation of the vane 320a in the direction of arrow 365 from a position that the slot 330 is radially aligned with the separator 358 to a position where the slot is adjacent and radially aligned with the abutment 343 corresponds to the movement of the vane 226 of the third embodiment from a position where slot 230 is radially aligned with separator 246 to a position that the slot 230 is radially lined with the abutment 244. Likewise the movement of the vane 320a from the last mentioned position to a position that is again radially aligned with the separator 358 corresponds to the portion of the thermodynamic cycle of the third embodiment wherein the vane 226 moves from a position wherein the slot 230 is radially aligned with the separator 247. Thus, it is believed that it is apparent that for each 360° rotation of the rotor 320 only two thermodynamic cycles take place. Likewise it is believed that it is obvious that if the vane 320b were rounded so as not to provide a fluid seal with the inner peripheral wall of the housing and no working substance were induced into the housing through the intake port 360 immediately prior to the time that the thus rounded vane member passes the intake port, the thus modified heat engine would be in effect a single cylinder engine. Likewise if the third embodiment of the invention were modified so that, for example, the vanes 227 and 225 did not form a sealing engagement with the housing and no fuel were injected through the respective intake ports during the corresponding movement of the thus modified vanes past the ignition space, only a four cylinder heat engine would be provided.

Further it is to be understood that it is not necessary that the vanes 320a, 320b have to be located diametrically opposed from one another, but rather the vanes 320b may be, for example, radially offset from the 180° position a desired amount and the heat engine will still be operative, provided that the cam track configuration is changed and the timing of the spark for igniting the working substance that is transferred from the position ahead of the leading surface of the vane 320b to the lagging surface of said vane is accordingly timed. The first, second and third embodiments may be correspondingly modified in that any one of the vanes may be formed to be angularly advanced from the other vanes or angularly offset in the lagging direction provided the timing of the spark is accordingly changed and the configuration of the cam track on the end plate (and other cams if provided) are changed so that the transfer of the compressed working substance from one side of the vane to the other is accomplished.

Thus, for example, the location of the vanes of the first two embodiments may be correspondingly modified provided that the cam tracks and timing of the spark are correspondingly changed. Further, for example, either one of the first two embodiments may be provided with half of the number of operative vanes and still the heat engine thus modified would be operable (the modification being of the manner similar to that described in respect to changing the configuration of the vanes of the third and fourth embodiments).

Operation of the first four embodiments of the heat engine of this invention having been described, the operation of the fifth embodiment, the refrigerating machine illustrated in FIGURES 11 and 12, will now be set forth. The operation of the fifth embodiment of this invention insofar as the introduction of the working substance to chambers 418 and 416 and the compression of the working substance in said chambers by the respective vanes is the same as that described with respect to the first embodiment. Likewise the exhaustion of the working substance from the chambers 415 and 417 is the same as the first embodiment. Also the movement of the respective transfer mechanism takes place in the same timed relationship relative to the angular movement of the vanes as that described for the first embodiment. The primary difference is that the system of working substance that is compressed into the recesses 406 and 405 is not ignited and that both cooling coils and refrigerating coils are provided on the housing. As a result, the system that is introduced through the intake port 410 into, for example, chamber 418 as it is being compressed between the leading surface 390a of the vane and the lagging surface 413b of the abutment 413 is cooled due to the flow of the coolant through the cooling coils 424. The cooled compressed system is transferred into the opening 406 similarly as the working substance was transferred into the ignition space of the first embodiment. After the vane has moved sufficiently in an angular direction the compressed and cooled system of working substance in the space 406 is permitted to move into the chamber 415 between the lagging surface 390b of the vane and the leading surface 413a of the abutment due to the transfer mechanism being cammed in a radially retracted direction. At that time the expanding system acts to cool the inner peripheral wall that in part forms the chamber 415 and thereby cools the refrigerating fluid that is being passed through the coils 428. In this connection it is to be noted that the direction of flow of the cooling fluid is such that the outlet 428b is located adjacent to the position that the initial expansion of the working substance takes place adjacent said outlet. After the working substance has expanded in the chamber 415 the vane is moved to a position whereby the next following vane may sweep the expanded working substance through the exhaust port 411. It is believed that it is apparent that for each 360° rotation of the power member about the rotary axis E eight separate and distinct refrigerating thermodynamic cycles takes place.

It is also believed to be obvious that if the inner peripheral wall of the housing were configurated in accordance with any of the other of the second, third or fourth embodiments and that the rotors and vanes were correspondingly configurated, that the different embodiments of a refrigerating machine would be provided. The operation of such a modified refrigerating machine insofar as the intake, compression and expansion of the gas would correspond to the operation of the respective heat engine other than that the compressed working substance would not be ignited. Likewise the number of refrigerating cooling cycles that take place for the thus modified refrigerating machine would be the same number of thermodynamic cycles that take place for the respective embodiment of the heat engine.

In order to furnish the necessary work to cause refrigeration, the shaft 394 of the refrigerating machine is connected to a drive shaft 397 of the driving engine 377. The passage of cooling fluid through the coils 423 and 424 forms high temperature reservoirs wherein energy is taken from the systems being compressed in chambers 416 and 418 respectively. Each system is introduced into the respective chambers 415, 417 to expand in contact with the peripheral walls in which the refrigerating coils are located, said refrigerating coils and the passage of refrigerating fluid through those coils providing low temperature reservoirs.

With respect to the sixth embodiment of the invention, see FIGURES 13 and 14, the intake, compression and ignition portions of the thermodynamic cycle thereof is the same as the corresponding portion of the thermodynamic cycle of the first embodiment of the invention. However, in order to use the work output obtained through the ignition of the combustible products the working substance in the chamber 500 as direct thrust, the conduit 458 is connected through appropriate ports in the end wall 467 to be connected to the thrust operative mechanism 459. In order to preclude the system of the working substance that is moved into the ignition space 491 by, for example, vane 471 being used for other than operating the direct thrust operated mechanism 459, the cam track 506 formed on the end wall 467 retains the vane 471 in a retracted position against resiliency of the springs 472 such as illustrated in FIGURE 4, the curvature of the cam track corresponding to the general radius of curvature of the rotor 469. It is to be mentioned in this connection that the cam track 506 extends from the leading edge of the ignition space to the axially extending portion of the separator that forms a fluid seal with the major portion of the rotor. It is to be understood that appropriate exhaust mechanism be provided in the thrust operated mechanism to exhaust the working substance transferred thereto through the conduit 407 after the work has been derived from the working substance.

Since each of the vanes as it is moved through the chambers 500 and 498 respectively is retained in the radial inwardly retracted position as the system of working substance expands, it is necessary that the power member be connected to the driving engine 452 in order to supply the necessary force for compressing the working substance in the intake chambers prior to the time that it is transferred to the ignition space. As previously mentioned, it is preferred that the driving engine be of a construction of one of the first four embodiments of the invention described heretofore.

Since the auxiliary radial movement of the vane as it is moved through the respective intake chambers is the same as described for the first embodiment and the function thereof is the same, and also since the operation and function of transfer mechanism is the same as that of the first embodiment the operation of the sixth embodiment will not be further described.

Except as otherwise set forth hereinafter, the operation of the seventh embodiment is the same as the first embodiment. The primary difference between the operation of the seventh embodiment (see FIGURES 15 and 16) and the first embodiment is that in the seventh embodiment an outlet port 574 is provided in the end walls 541 to open to each of the exhaust chambers in order to derive the direct thrust power output for operating thrust operated mechanism such as 531. However, in order that the amount of force required to drive the power member is expended against the respective vanes of the heat engine, a variable valve 530 is provided in the direct thrust power output line.

In the seventh embodiment of the invention the intake and compression portions of the thermodynamic cycle are the same as the first embodiment. However, after a compressed system has been transferred into the ignition space 569 so that it is spatially isolated from, for example, chambers 577 and 578 and the working substance is ignited, the expansion thereof serves two functions. The first function of the expansion of the working substance that takes place between, for example, the lagging surface 542b of the vane and the leading surface 554a of the abutment is to impart a driving force to the rotor member. The second function provided by the expanded working substance is derived through the provision of the port 574 in the stationary end wall is to drive the direct thrust operated mechanism. That is, when the transfer mechanism 556 is in its innermost position as illustrated in FIGURE 15, the port 574 is blocked. However, upon the transfer mechanism being retracted in the direction of the arrow 557, the port 574 is placed in fluid communication with the portion of the chamber 578 between the lagging surface of the vane and the leading surface of that abutment. The transfer mechanism 556 is cammed back to its inward position in the direction opposite arrow 557 to form a fluid seal with the rotor prior to introduction of the second system of working substance into the ignition space 570 similarly as that which took place in the second embodiment of the invention.

In place of the transfer mechanism utilized in either the first or second embodiments of the invention, the second embodiments may be modified in accordance with the teachings relative to the eighth embodiment. Thus it is to be understood that even though the eighth embodiment has only been described with respect to a power member having four radially movable vanes that are cammed in the radial direction due to configuration of the inner peripheral wall of the housing, the same transfer mechanism may be used in the second embodiment of the invention.

Since the intake portion of the thermodynamic cycle and the exhaust portion of a thermodynamic cycle is the same as that described relative to the first embodiment, it will not be set forth for the eighth embodiment. Thus the description of the operation of the eighth embodiment will be described with respect to the system being compressed between the lagging surface 623b of the abutment and the leading surface of the vane. As, for example, vane 612 approaches the lagging axially extending edge of the slot 626, the arcuate plate 632 is retracted in the slot to permit the transfer of the working substance into the cylindrical chamber 625. This camming action of the mechanism takes place due to the configuration of the cam track 641. At the time the axial edge of the roller bearing 614 is substantially co-extensive with the lagging edge of the slot 626, the arcuate plate 632 has already been cammed back to the position illustrated in FIGURE 17 to prevent the compressed system from moving back into the chamber 648 as the vane 612 moves angularly past the slot 626.

After the arcuate plate 632 has been returned to a closed position, a spark is provided in the cylindrical chamber by the spark mechanism 649. At substantially the same time or slightly after the provision of the spark, the arcuate plate 633 is retracted in the slot 627 due to the cam follower 645 being cammed radially outwardly relative to the rotary axis by cam track 646. Before the arcuate plate 633 is cammed outwardly, the vane 612 has been moved to a position angularly in advance of the leading edge of slot 627. Due to the action of springs in the groove the vane is retained in fluid sealing engagement with the leading surface of the abutment and therefore the expansion of the previously compressed system of the working substance takes place between the lagging surface of the vane 612 and the leading surface 623a of the abutment. After the vane 612 has advanced in the direction of the arrow 650 to be closely adjacent to the exhaust port (not shown) but prior to the time that the arcuate plate 632 is cammed radially outwardly, the cam track 646 is configurated to move the cam follower 645 in a radial inward direction and thereby cause the arcuate plate 643 to be moved to a position which is to close the opening between the hollow cylindrical chamber and the chamber 649. This is to insure that at no time any portion of the chamber 648 is in direct fluid communication with any portion of the chamber 649. It is believed from the previous description that the operation of the eighth embodiment is apparent.

Although the manner of lubricating the various moving parts that are in engagement with parts in which they are movably retained has not been specifically described other than for the first and third embodiments of the invention, it is to be understood that the parts may be lubricated in accordance with the teachings relative to the first and third embodiments of the invention. Thus, for example, with respect to the eighth embodiment, an axially extending fluid channel may be provided in the abutment to open into each of the slots 626 and 627 at a position to always open onto the surface of the arcuate plate 632 and 633 respectively irrespective of whether the plates are in a retracted position or radial inwardmost position as illustrated and still preclude free flow of lubricating fluid into said slots.

It is also appropriate to mention that the springs described and illustrated in the embodiments of this invention, although preferred for reasons of simplicity in construction, may be replaced by appropriate hydraulic operated mechanism or by appropriate pneumatic operated mechanism, or by appropriate combined pneumatic and hydraulic mechanism that perform essentially the same function as the spring.

Although the heat engines heretofore described have been described in terms of spark ignition of combustible mixtures, this invention is not limited to such ignition means, nor is it limited merely to combustible materials. For combustible materials ignition may as well be accomplished, for example, through autoignition by maintaining appropriate temperatures of the walls of the housing that in part form each ignition space and each expansion chamber. Appropriate exothermic chemical reactants may likewise be used wherein one of said reactants shall be injected at appropriate times into each space heretofore generally termed ignition space and wherein said injection shall be caused by injection mechanism positioned so as to inject latter said reactant at a region heretofore generally termed and schematically illustrated as spark means.

Also as will become more apparent hereinafter, each of the embodiments of heat engines may initially be started by conventional starting mechanism. Once the engine has been started the starting mechanism will be disengaged to break the driving connection to the rotating members of the heat engine.

Starting of those heat engines employing exothermic chemical reactants may be accomplished by conventional means of employing a flywheel having gear teeth about a circumferential path which said flywheel shall be integral with a rotary shaft of the heat engine and which gear teeth shall be in engagement with a rotary gear of a conventional starter motor in such time as said engine shall be started. This starter mechanism when actuated shall cause the rotor of said engine to rotate thereby causing the respective vanes to move working substance into regions where chemical reaction shall be initiated, whence work derived from working substance shall drive the power member. It shall be noted that for those embodiments having a rotary end plate that gear teeth about a circumferential path on the endplate will suffice instead of similar gear teeth in a flywheel.

For those employments in which a heat engine shall operate by means other than exothermic chemical reaction starting is accomplished by forcing of cooling fluid and heating fluid, respectively, through appropriate coils. Starting may be assisted by means set forth in the preceding paragraph.

From the aforegoing disclosure it is believed apparent that the number of chambers within the housing and the number of vanes provided, respectively, for any of the embodiments and modifications thereof described are limited only by the physical size of parts used to construct the rotary apparatus of this invention. Also, it is to be understood that the number of thermodynamic cycles associated with each vane as it rotates 360° about a primary axis is limited by the number of chambers that have been formed in the housing. Further, it is to be mentioned that the number of thermodynamic cycles that may occur for each 360° rotation of a power member in a housing forming two separate and distinct chambers with the power member as heretofore described would depend upon the number of angularly spaced vanes that exist as portions of the power member.

That is, in the rotary apparatus of this invention other than is limited by the physical size of the parts used, there may be provided any $n$ integral number of vanes greater than or equal to one that shall be caused to traverse a closed path and also some $p$ integral number of vanes greater than or equal to zero wherein said $p$ vanes do not include any of said $n$ vanes. The $p$ vanes in motion shall be caused to traverse some separately distinct $k$ closed paths where $k$ may be any integer greater than or equal to zero but which can be equal to zero if and only if $p$ is identically zero. Therefore, the rotary apparatus of this invention shall include $n+p$ number of vanes wherein each vane in motion shall be caused to follow some particular one of the existing $k+1$ vane paths.

Also the rotary apparatus of this invention shall include any integral number of abutments greater than or equal to $k+1$ of which abutments at least one shall be associated with each of the existing $k+1$ vane paths. Further, said rotary apparatus shall include some $k+1$ integral number of enclosures, wherein an enclosure shall comprise a housing and endplates as heretofore described, of which enclosures only one shall be associated with each of the existing vane paths.

If an induction-exhaust type of rotary heat apparatus is provided it will have some integral number of separators greater than or equal to $k+1$ where at least one separator shall be associated with each one of the existing $k+1$ vane paths. If a rotary heat apparatus other than induction-exhaust type is provided, then the aforegoing statements relative to the number of separators does not necessarily hold true.

Rotary heat apparatus of this invention as heretofore described may be of large diameters having many chambers and many abutments. Hence, for example, in the employment of such apparatus as a direct thrust engine extremely high forces may be caused to act upon thrust operated mechanisms. Further, multiples of axially coincident pairs of such apparatus may be positioned such that the rotor in each unit of each pair shall rotate in an opposite direction to the rotor of the other unit of said pair. The counterrotating rotors or shafts of each such pair may be mechanically linked, as for example, by gears to thereby insure the same angular speed of each of the rotors of said pair, whence the net precessional torque of said pair shall approach zero. In addition, the chambers of one unit of such a pair may be positioned as to be out of phase relative to the retraction of the respective vanes or abutments in the other unit of said pair whereby each unit will in a sense act as the flywheel of the other unit.

Also, for example, in the seventh embodiment of this invention, both end walls may be integrally fixedly secured to the housing, it being further provided that the respective vanes not be channeled in either endplate and that each vane extend just the axial length between the end plates. The expansion chambers of this unit may each be placed in fluid communication with an expansion chamber of another similar unit, which fluid communication shall be caused by an end plate of the first unit fixedly secured to the housing and having an opening therein similar to 507 adjacent a similar opening in the end wall of the second unit. Another similar opening in the opposite end wall of said second unit places the expansion chamber of the second unit in fluid communication with thrust operated mechanism or in fluid communication with still additional units.

Further, if a pair of axially coincident units have rotors that shall counterrotate independently of each other the net precessional torque may be controlled by the angular speed of one rotor relative to the other. Thus, the net gyroscopic effect may be controlled by said relative angular speed and this effect may be used to advantage, for example, with direct thrust embodiments for directional control of missiles in space.

A further advantage to direct thrust engines of this invention is the provision of a power shaft that may be used to drive auxiliary mechanism as, for example, generators and pumps while at the same time providing useful work as thrust. Relative to direct thrust engines of this invention, it shall be noted that thrust operated mechanism may include, for example, a DeLaval nozzle or some other appropriate jet exhaust nozzle. As further example, such direct thrust engines may be caused to have their respective intake ports in fluid communication with a subsonic diffuser which in turn is in communication with a supersonic diffuser, which respective diffusers are conventionally employed for air intake mechanism of certain thermal jets, such as ramjets, and which said diffusers provide high pressure air at engine intake ports. Such intake mechanism in conjunction with a direct thrust engine of this invention can be of value in missiles, wherein atmospheric air may be utilized to provide oxidant to said engine whereby said missile may be propelled to outer regions of the atmosphere and wherein oxidant may be stored within said missile for use only subsequent to said missile having attained considerable speed and having passed through a considerable portion of the atmosphere.

Fluid flow through the cooling and refrigerating coils as set forth in the description of the fifth embodiment is not restricted to the direction of flow previously specified. Further, it is felt apparent that such coils can be employed for cooling off, for example, the internal combustion units herein described and can be employed to effect heat exchange between chambers within an engine or between engines as may be desirable. It is to be further understood that the respective coils may be replaced by essentially outwardly radially extending fins integral with the housing which said fins are in thermal communication with material substance having respective temperatures appropriate for the particular employment desired of those fins.

The fifth embodiment of this invention has been heretofore described as a refrigerating machine wherein the driving engine provides the work required to accomplish refrigeration. It is believed apparent from the discussion heretofore that certain modification of structure as herein- after set forth will permit said refrigerating machine to operate as a heat engine wherein certain working substances may be employed to convert thermal energy into useful work without ignition of combustible materials. Such modification may be effected in part by forming mechanism 390 to be such as to place shaft 394 in engagement with shaft 397 only in such time as 376 shall be started, and wherein the driving engine shown in FIGURE 11 shall be a starter motor of conventional type to be disengaged by mechanism 390 after starting of the heat engine. Alternatively, mechanism 390, shaft 397 and the driving engine may be eliminated, and other starting means as set forth may be employed. Additionally to effectuate the last mentioned modification, it is required that high temperature fluid flowing through respective coils 427 and 428 shall comprise high temperature thermal reservoirs and that cooling fluid flowing through respective coils 423 and 424 shall provide low temperature thermal reservoirs. Such engines are applicable to conversion of thermal energy into useful work wherein the source of thermal energy may be, for example, a nuclear reactor wherein heated fluids that are caused to flow from said reactor shall constitute the high temperature fluid of the respective said high temperature thermal reservoirs.

In the heat engine described in the preceding paragraph as well as in the refrigerating machine of the fifth embodiment wherein the associated thermodynamic cycles do not involve release of thermal energy by exothermic chemical reactants, the working substance may be continuously recycled through the rotary heat apparatus by one of two alternative mechanisms. The first of these is by providing structure that forms an enclosed chamber and that the exhaust and inlet ports of the housing are placed in fluid communication with the aforementioned chambers. As a result the working substance passing through the rotary apparatus of this invention is exhausted into the aforementioned chamber and a new charge is taken from said chamber through the inlet port of the housing to thereby provide for recirculation of the working substance. The second mechanism requires that each separator be so formed as not to be in contact with circumferential surface of the rotor as it rotates and that the exhaust and intake ports as such be eliminated. Instead there would be provided an opening for initially charging the appropriate chambers of the engine with working substance and replenishing the charge as needed. It is believed apparent that each of the embodiments of this invention may be employed either as a rotary heat engine or as a rotary refrigerating machine wherein the particular employment of any embodiment is subject to the teachings heretofore set forth.

The embodiments of this invention are of such design as to permit mounting one or more flywheels as to be integral with a rotary shaft of a particular unit wherein more uniform rotary motion of the rotor may be assured by said flywheel.

Figure 6:
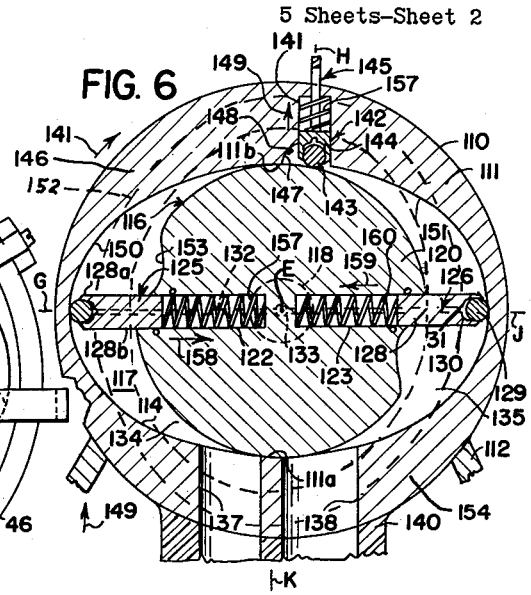
FIGURE 6 is generally a cross sectional view of a second embodiment of the heat engine of this invention taken perpendicular to the axis of rotation, said view correspondng to FIGURE 2 of the first embodiment.

In order that the breadth of this invention may be more readily ascertained, an equation describing the preferred configuration of the inner peripheral wall of the housing so as to properly cam the sliding vanes of the nature illustrated in FIGURES 2 and 6 will be set forth. Although the aforementioned figures show four vanes and two abutments, respectively, it is believed apparent from the disclosure herein that any number of vanes may be utilized within the limits of the physical dimensions of the particular unit to be built.

Considering a sliding vane of the construction illustrated in FIGURE 2, and referring to FIGURE 20, suppose that the vane has continuous primary angular motion (direction of the arrow 670) through a given chamber about axis 671, and that the vane in traveling through the chamber shall traverse a particular region of space within the housing such that (1) The center of mass of the vane shall be at its minimum radial distance, $r_0$, as the center of mass just begins to enter said region at 679;

(2) The center of mass of the vane shall move to its maximum radial distance, $r_1$, at 678 as the vane completes traversing the first part of said region; and (3) The center of mass of the vane shall have returned to its minimum radial distance as the vane completes traversing the second part of said region and as the center of mass just begins to leave said region at 676.

Let $\theta$ denote the angular displacement of the center of mass of said vane, where $\theta$ is taken as positive in the direction of primary angular motion, and where $\theta$ is equal to zero as said center of mass just begins to enter said spatial region at 679. Let $\beta$ denote that particular angle of $\theta$ at which the vane's center of mass shall exist at its maximum radial distance from the primary rotary axis, and let $\alpha$ denote that particular angle of $\theta$ at which the vane's center of mass shall have just returned to its minimum radial distance as said center of mass just begins to leave said spatial region at 676. Let $r$ denote the radial distance of the vane's center of mass at each value of $\theta$ for $0 \leq \theta \leq \alpha \leq 2\pi$ radians, whence it should be clear that $r$ is a variable dependent upon $\theta$. It is required that $\beta < \alpha$, and it is preferred that $r_0 \geq 0$.

It is preferred that the inner surface of the housing be formed in such a manner as to cause the center of mass of each vane to move over each such said spatial region such that the following equation is obeyed:

$$r = k_1 e^\theta + k_2 e^{-\theta} - C_1 \theta - C_2$$

wherein $e$ is the base of natural logarithms and wherein the constants $k_1$, $k_2$, $C_1$ and $C_2$ are defined as hereinafter set forth.

For the bounded interval $0 \leq \theta \leq \beta$, $$k_1 = \frac{r_1 - r_0}{2(1 - e^\beta) - \beta(1 + e^\beta)}$$

$$k_2 = \frac{e^\beta (r_1 - r_0)}{2(1 - e^\beta) - \beta(1 + e^\beta)}$$

$$C_1 = \frac{(1 + e^\beta)(r_1 - r_0)}{2(1 - e^\beta) - \beta(1 + e^\beta)}$$

and $$C_2 = \frac{(1 - e^\beta)(r_1 - r_0)}{2(1 - e^\beta) - \beta(1 + e^\beta)} - r_0$$

For the bounded interval $\beta \leq \theta \leq \alpha$ $$k_1 = \frac{e^{-\beta}(r_1 - r_0)}{2(1 - e^{\alpha - \beta}) - (\beta - d)(e^{\alpha - \beta} + 1)}$$

$$k_2 = \frac{e^\alpha (r_1 - r_0)}{2(1 - e^{\alpha - \beta}) - (\beta - \alpha)(e^{\alpha - \beta} + 1)}$$

$$C_1 = \frac{(e^{\alpha - \beta}) - (r_1 - r_0)}{2(1 - e^{\alpha - \beta}) - (\beta - d)(e^{\alpha - \beta} + 1)}$$

and $$C_2 = \frac{[e^{\alpha - \beta} - \alpha(e^{\alpha - \beta} + 1)](r_1 - r_0)}{2(1 - e^{\alpha - \beta}) - (\beta - d)(e^{\alpha - \beta} + 1)} - r_0$$

For illustrative purposes, it may be noted for each such said spatial region represented in FIGURE 20 and further shown in FIGURE 2 that $\alpha$ approaches $\pi/2$ radians, that $\beta = \alpha/2$, and that there are four such spatial regions (chambers) shown in said FIGURE 2; the respective values of $\alpha$ and of $\beta$ as well as the number of such spatial regions are not to be construed as limited to these particular values.

In order that the force with which the vanes shall bear against the inner peripheral wall of the housing may be as small as possible, it is desired that $r_0$ be as close to zero as possible, wherein $r_0$ may be caused to more closely approach zero, for example, by forming the vanes in such manner that their respective radially outermost portions shall have hollow construction, or by oher mechanism (not illustrated) wherein masses of solid material substance shall be formed integral with said respective vanes and which masses shall extend radially inward from each vane into the inner reaches of the rotor. That is, $r_0$ shall be caused to approach zero by causing each vane to have a relatively large mass concentration at radially inwardmost positions of that vane.

In resumé of the invention heretofore described, it is to be noted that in at least one or more of the embodiments disclosed, the structure has been described to accomplish the objectives set forth. Thus, as set forth with respect to each of the embodiments each one of the vanes thereof of a general number of vanes (wherein said general number is an integer greater than or equal to one) has auxiliary motion in essentially a radial direction relative to the axis of rotation E that is not dependent upon the auxiliary motion of any one of the other vanes, notwithstanding that said auxiliary motion in essentially a radial direction may be identically zero as, for example, for parts of each vane in the third and fourth embodiments of this invention. Similarly, as set forth with respect to each embodiment each one of the abutments thereof has motion relative to the axis of rotation E that is not dependent upon the motion of any one of the other abutments, notwithstanding that the abutment may have no motion as, for example, in the first, second, fifth, sixth, seventh, and eighth embodiments of this invention. Likewise, the motion of each separator is independent of the motion of the other separators even though the separator may have no motion as, for example, in the latter stated sets of embodiments. Further, the auxiliary motion of each vane is dependent upon no more than a single abutment at any given instant, and the motion of each abutment is dependent upon no more than a single vane at any given instant. Similarly, the auxiliary motion of each vane is dependent upon no more than a single separator at any given instant, and the motion of each separator is dependent upon no more than a single vane at any given instant. As a result, a general integral number of vanes greater than or equal to one may be associated with any given vane path, and a general integral number of abutments greater than or equal to one may be associated with any given vane path. However, for an induction-exhaust engine, it is preferred that the number of separators associated with a given vane path be identically equal to the number of abutments associated with said same vane path.

The described invention is a general rotary heat apparatus in which one or several given masses of working substance may be continually recycled through said apparatus; or rotary heat apparatus of this invention is a general rotary heat apparatus in which a different distinct mass of working substance may be induced at initiation of each given thermodynamic cycle and said mass exhausted at the end of that cycle. Further, the intake masses are separated from the exhausting working substance by the provision of general separators, there being one general separator for each region of the working substance path at which region both induction and exhaust are caused, each said separator being positioned so as to cause said separation. The choice of continuous recycling of working substances or of inducing new working substance at the initiation of each thermodynamic cycle depends upon which particular thermodynamic cycle is chosen and on which choice of processing a particular working substance may be desired. Further the particular exhaust mechanism selected for the induction-exhaust engine may depend in part on the quantity of available useful work desired to be delivered to the vane or vanes and the quantity of available useful work desired to be delivered as thrust to other mechanisms.

As apparent from the preceding description the applications of this invention are extremely broad. For example, special internal combustion units operated by Otto or diesel cycles are within the scope of the invention and will be useful in applications to automobiles, aircraft, marine craft and to other driven units; and by modifying engines to recycle portions of working substances the heat engine of this invention is very useful in applications to derive useful work from atomic reactors. Additionally, direct thrust units may be readily made that are applicable to aircraft and/or missiles of various assorted and sundry types wherein the thrust is obtained through mechanism in fluid communication with an outlet port(s) in the end wall such as described.

Spatial isolation of essentially all of each compression chamber from essentially all of each expansion chamber is of considerable value in affording the possibility of controlling the thermodynamic change of state that shall occur in each said chamber of rotary heat apparatus heretofore described.

As many widely apparent different embodiments of this invention may be made without departing from the spirit and scope thereof, it is to be mentioned that I do not limit myself to the specific embodiments herein.

What I claim is:

1. In rotary apparatus for carrying out a thermodynamic cycle on a system of working substance comprising a housing, a power member, means for rotatably supporting said power member within the housing to rotate about a rotary axis, the aforementioned means including end walls forming fluid seals with opposite ends of the housing, said power member and housing having cooperating means for forming within the housing at least a first chamber and a second chamber separate from and angularly spaced from the first chamber to sequentially retain a system of working substance spatially isolated in the respective chamber from the other chamber, said cooperating means including a separator, a vane, an abutment, and second means mounting said vane, and separator and abutment for relative radial motion, said vane and abutment each having a leading surface portion and a lagging surface portion, the abutment lagging surface portion in part forming the first chamber and the abutment leading surface portion in part forming the second chamber, said vane being a part of the power member and at least most of a cycle of rotation of the power member forming a fluid seal with the housing chamber walls including when said vane is angularly moved through said chambers, said power member in rotating angularly moving the vane through the first chamber compressing a first system between the leading surface portion of the vane and the lagging surface of the abutment, said housing having an opening adjacent the abutment lagging surface portion into which said compressed system is forced to be spatially isolated from said first and second chambers just prior to the vane being angularly moved to have the lagging surface portion thereof extend into said second chamber, said cooperating means including radially movable means angularly in advance of said opening for permitting the system in said opening expanding into said second chamber between the leading surface portion of said abutment and the lagging surface portion of said vane only after the vane lagging surface portion has angularly moved into said second chamber and retaining the compressed system in said opening until the vane leading surface portion has moved angularly in advance of said opening, and means for changing the energy level of the working substance prior to any substantially expansion into said second chamber.

2. The apparatus of claim 1 further characterized in that the cooperating means includes means for providing a third chamber and a fourth chamber separate from and angularly spaced from each other and from the first and second chambers, said third and fourth chambers being spatially isolated from one another and from the first and second chambers, the last mentioned means including a second abutment, a second vane, a third vane, and a fourth vane; said vane and abutment mounting means also mounting said second abutment, and said second vane, third vane and fourth vane for relative radial movement, said second abutment having a lagging surface portion in part forming the third chamber and a leading surface portion in part forming the fourth chamber, said second, third and fourth vanes each having a leading surface portion and a lagging surface portion and forming a moving fluid seal with the respective housing chamber walls for the most part of a cycle of rotation of the power member, said housing having a second opening adjacent the second abutment lagging surface portion into which a compressed system other than the first system is forced to be spatially isolated from said third and fourth chambers just prior to the adjacent vane being angularly moved to have the lagging surface portion thereof extend into said fourth chamber, said cooperating means including second means for permitting the system in said second opening expanding into said fourth chamber between the leading surface portion of said second abutment and the lagging surface portion of the last mentioned vane only after its lagging surface portion has angularly moved into said fourth chamber, and means for changing the energy level of the working substance of the other system prior to any substantial expansion of said other system into said fourth chamber.

3. The apparatus of claim 2 further characterized in that the working substance includes combustible material, that said housing has an intake port opening into each of the first and third chambers respectively adjacent the lagging surface portion of the respective chambers, an exhaust port opening into each of the second and fourth chambers respectively adjacent the leading surface portion of the respective chambers, that each housing opening is an ignition space adjacent the leading surface of each abutment and that the means for changing the energy level of the working substance comprises means mounted on the housing to ignite the combustible material of the working substance in each of the respective ignition spaces.

4. The apparatus of claim 1 further characterized in that the working substance includes combustible material, that the means for changing the energy level of working substance comprises means extended into said opening for igniting the compressed system of working substance, that the housing has an intake port opening into the first chamber adjacent the lagging edge thereof, that an end wall is fixedly secured to the housing and has a power outlet port to open into said second chamber.

5. The apparatus of claim 4 further characterized in that the second means includes a power member rotor having a groove slidably retaining said vane and means in said groove for urging said vane with the adjacent portion of the housing, said end wall having a cam portion extending into the second chamber for retaining said vane in a retracted position as said vane is moved angularly through said second chamber.

6. The apparatus of claim 4 further characterized in that said means for permitting expansion of the compressed system comprises transfer mechanism and means connected to said transfer mechanism for moving said transfer mechanism for radial movement between a radial inward position and a radial retracted position permitting said compressed system moving out of said outlet port, said power outlet port being located to be blocked by said transfer mechanism in a radial inward position and unblocked by said transfer mechanism being moved to a retracted position.

7. The apparatus of claim 1 further characterized in that the housing opening includes a hollow chamber in the abutment plate mounting slot opening to the first chamber and to the hollow chamber, and a second plate mounting slot opening to the second chamber and to the hollow chamber and that the means for permitting the compressed system to expand behind the lagging surface of the vane that compressed it includes a first plate slidably movable in said first slot for alternately permitting the hollow chamber being in fluid communication with the first chamber and blocking fluid communication there-between, a second plate slidably mounted in said second slot for alternately placing said hollow chamber in fluid communication with the second chamber and blocking fluid communication between the second chamber and the first chamber and means moving said plates in said slots in the aforementioned manner in timed sequence to place the hollow chamber in fluid communication with the first chamber and blocking fluid communication to the second chamber as the first system is being compressed in the first chamber and then moving the first plate to block fluid communication between said first chamber and hollow chamber prior to the vane moving angularly past the opening to the first chamber and moving said second plate to permit fluid communication between the hollow chamber and the second chamber after the vane has moved angularly past the leading edge of the opening from the hollow chamber to the second chamber.

8. Rotary apparatus for carrying out a thermodynamic cycle on a system of working substance comprising a housing having an inner peripheral wall, a rotor mounted in said housing to rotate about a given axis, said inner peripheral wall being configurated to form in conjunction with the rotor at least two separate angularly spaced chambers, said housing having an abutment that has a portion that forms a fluid seal with the rotor along the axial length of the rotor, said housing inner peripheral wall being configurated to form leading and lagging camming surfaces that are respectively curved radially outwardly in an angular direction away from said fluid seal portion, end plates at either axial end of the rotor for closing either axial end of said chambers, said abutment having an opening adjacent to the fluid seal portion and on the second chamber side thereof, said rotor having a radially extending vane mounting groove, a vane for forming a fluid seal with the inner peripheral wall of the housing slidably mounted in said groove for movement from a retracted position where the outermost radial portion is located substantially the same distance from the rotary axis as the circumferential surface of the rotor and an extended position to divide each chamber into two spatial regions of varying capacity as it is moved angularly therethrough, means located in the groove for urging said vane into engagement with the inner peripheral wall, said vane having a leading surface and a lagging surface and as being angularly moved through the first chamber, causing a system of working substance in the first chamber to be compressed between the vane leading surface and abutment lagging surface, said rotor having a circumferential recess adjacent the vane leading surface to permit the compressed system being forced into said abutment opening as the vane angularly approaches the abutment fluid seal portion, said abutment having a slot angularly in advance of said abutment opening, and transfer means movably extending into said slot for retaining the working substance in said opening as the vane abutment engaging portion moves to an angular position at the leading edge of said opening and alternately movable away from the rotor to allow said working substance to expand into the second chamber intermediate the abutment leading surface and the vane lagging surface after said vane engages the abutment leading surface of the leading edge of said slot, said transfer means including means forming a fluid seal with said rotor, and means operated by the movement of the rotor for moving the transfer means relative the rotor in the aforementioned manner, said housing having an intake port opening into the first chamber adjacent the lagging edge thereof and an outlet port opening into the second chamber adjacent the leading edge of the housing leading camming surface, and means for changing the energy level of the working substance prior to any substantial expansion in said second chamber.

9. The apparatus of claim 8 further characterized in that at least one of said end walls is fixedly secured to the housing, said one end wall having the outlet port located therein in position to be blocked by said transfer means in a working substance retaining position and permitting working substance to expand therethrough when the transfer means is in a position to permit the working substance to expand into the second chamber.

10. The apparatus of claim 8 further characterized in that said energy level changing means includes cooling coils provided in the housing adjacent the first chamber inner peripheral wall and that refrigerating coils are provided in the housing adjacent the second chamber inner peripheral wall.

11. The apparatus of claim 8 further characterized in that said housing in conjunction with the rotor are shaped to form third and fourth chambers with the fourth chamber angularly in advance of the third chamber and both angularly spaced from the first and second chambers, said housing having a second abutment with an axially extending portion forming a fluid seal with the rotor to separate the third chamber from the fourth chamber, said second abutment having a lagging surface portion forming a part of the third chamber, a leading surface portion forming a part of the fourth chamber, and an opening adjacent the axially extending portion to have a compressed system of working substance forced thereinto, means mounted on the second abutment on the opposite side of the second abutment axial portion from the second abutment opening for alternately retaining a compressed system in the second abutment opening and permitting the compressed system to expand into the fourth chamber after the lagging surface portion of the vane that compressed said system has moved into the fourth chamber, and means mounted on said housing to extend into said second opening for causing a change in the energy level of the compressed system therein, said housing having an intake port opening into the third chamber angularly rearwardly of the second abutment lagging surface portion and an outlet port opening into the fourth chamber angularly in advance of the second abutment leading surface portion.

12. The apparatus of claim 11 further characterized in that said means forming a fluid seal includes an axially elongated roller bearing and a transfer bar having a recessed portion shaped to alternately rotatably retain the roller bearing in fluid sealing engagement with the rotor and move it out of said fluid sealing engagement and that said vane includes a roller bearing and a vane bar having a recessed portion to rotatably retain the last mentioned roller bearing in fluid sealing engagement with the housing inner peripheral wall and that each of the end plates are joined to the rotor to rotate therewith.

13. Rotary apparatus for carrying out a thermodynamic cycle on a system of working substance comprising a housing having an inner peripheral wall, a rotor mounted in said housing to be rotated about a given axis, and walls at either axial end of the rotor forming a fluid seal with the housing, said rotor having a vane with a shoulder portion that substantially forms a fluid seal with the housing inner peripheral wall, a lagging surface portion curved radially inwardly in an angularly rearwardly direction from the shoulder portion and a leading surface portion curved radially inwardly in an angularly forward direction from said shoulder, an abutment and a separator each mounted in the housing for radial movement in engagement with the rotor as it rotates to form a fluid seal therewith, said abutment and separator being mounted in angular spaced relationship, means on the housing for constantly urging the abutment and the separator into engagement with the rotor, said abutment having a leading surface portion and a lagging surface portion, said housing having an inlet port on the leading surface side of the separator and closely adjacent thereto and an exhaust port on the lagging surface side of the separator and closely adjacent thereto, said housing and rotor having cooperating means for transferring a system of working substance from between the leading surface portion of the vane and the lagging surface portion of the abutment to exist between the lagging surface portion of the vane and the leading surface portion of the abutment as the vane moves from a position angularly rearwardly of the abutment to a position angularly in advance of the abutment and means for imparting a change in the energy level of the system as the vane moves angularly past the abutment to impart a driving force to the vane.

14. The apparatus of claim 13 further characterized in that working substance includes combustible material and that the last mentioned means comprises means for igniting the combustible material.

15. In rotary apparatus for carrying out a thermodynamic cycle on a system of working substance, a housing, a power member rotatably mounted in said housing, end walls at either axial end of the power member forming a fluid seal with said housing, said housing and power member having cooperating means for first compressing a system of working substance and then permitting the compressed system to expand, and means on the housing for changing the energy level of the working substance prior to any substantial expansion thereof, said power member cooperating means includes a vane having a leading surface portion and a lagging surface portion and that said cooperating means includes means for transferring a compressed system from in advance of the leading surface of the vane to exist rearwardly of the lagging surface of the vane as the vane is moved angularly past said energy level changing means, the transfer means including a housing abutment having an axially elongated opening, and a slot angularly in advance of said opening and in fluid communication with said opening, means movably mounted in said slot to form a fluid seal with said power member and alternately permit the fluid in said opening to expand as the vane moves angularly in advance of said slot and means operated by the rotation of said power member for moving said fluid seal means to form a fluid seal with said power member as the vane leading surface angularly approaches said opening and away from said power member after the vane lagging surface angularly moves past said opening.

16. In rotary apparatus for carrying out a thermodynamic cycle on a system of working substance comprising a housing having an inner peripheral wall, a power member located in the housing and rotatable about a primary rotary axis, an end wall at either axial end of the power member forming a fluid seal with the respective end of the housing and fixedly secured to the respective end of the power member to rotate therewith, said housing and power member having cooperating abutment and vane means respectively for first compressing a given system as the power member rotates and then deriving work from the given system as it expands, the abutment means and vane means each having a leading surface portion and a lagging surface portion, said cooperating means also including a separator, means mounting said vane means and separator and abutment means for relative radial movement to provide at least two separate angularly spaced chambers and to separtae each chamber into two spatial regions of varying capacity as the vane means is moved angularly through the respective chamber, and means for retaining the compressed system in spatial isolation between the two chambers as the vane means moves angularly from the first chamber into the second chamber, and after the vane means lagging surface portion has moved into the second chamber to permit the compressed system to expand into the second chamber, said means for retaining the compressed system in spatial isolation between the two chambers including a transfer member mounted for movement toward and away from the rotary axis, said abutment having a slot to slidably retain the transfer member, and cammed means mounted on the housing for alternately moving said transfer member inwardly and outwardly in proper timed sequence, said end walls having cam tracks for operating the cammed means, and means in the housing for changing the energy level of the working substance prior to any substantial expansion in the second chamber.

17. Rotary apparatus comprising a housing having an inner peripheral wall, a vane rotatably mounted in said housing and having a shoulder portion of substantial circumferential length to form a fluid seal with the said peripheral wall, an abutment slidably mounted on said housing to form a fluid seal with the vane as it rotates, a separator angularly spaced from the abutment and slidably mounted on the housing to form a fluid seal with the vane as it rotates, said abutment and separator each having a leading surface portion and a lagging surface portion, said housing having an intake port closely adjacent the leading surface portion of the separator and an exhaust port closely adjacent the lagging surface portion of the separator, said vane having a groove opening through the shoulder portion to the housing, cammed vane means in the groove for alternately being retracted in the groove and being moved to be substantially coextensive with the shoulder surface, said housing having an opening adjacent the lagging surface portion of the abutment, means located in said opening for providing a fluid space therein and subsequently forcing fluid out of said opening, said housing having an ignition space on the opposite angular side of the abutment from said opening, ignition means extending into said opening, an end wall at either axial end of the vane forming a fluid seal with the housing, at least one of said walls being fixedly secured to the housing, a shaft connected to the vane to rotate therewith and extended through the last mentioned end wall, a cam mounted on the shaft, means operated by the cam for moving the means in the housing opening in the manner set forth, and a cam mounted on the fixedly mounted end wall between said end wall and the vane for operating said cammed vane portion.

References Cited in the file of this patent

UNITED STATES PATENTS

| 1,069,516 | Auensen | Aug. 5, 1913 |
| 1,249,881 | Anglada | Dec. 11, 1917 |
| 1,307,282 | Ward | June 17, 1919 |
| 1,808,084 | Tidd | June 2, 1931 |
| 2,048,825 | Smelser | July 28, 1936 |
| 2,174,664 | Korany | Oct. 3, 1936 |
| 2,373,304 | Garbeth | Apr. 10, 1945 |
| 2,652,686 | Johnson | Sept. 22, 1953 |

FOREIGN PATENTS

| 569,615 | France | Jan. 8, 1924 |
| 627,392 | France | June 7, 1927 |